Nov. 8, 1955 C. M. SAVRDA 2,722,711

FISH-FILLETING APPARATUS

Filed Feb. 9, 1949 20 Sheets-Sheet 1

INVENTOR.

CHARLES M. SAVRDA

By Edwin Leisohn & Harry Cohen

ATTORNEYS.

INVENTOR.
CHARLES M. SAVRDA
BY Edwin Leisohn & Harry Cohen
ATTORNEYS.

Nov. 8, 1955    C. M. SAVRDA    2,722,711

FISH-FILLETING APPARATUS

Filed Feb. 9, 1949    20 Sheets-Sheet 3

INVENTOR.
CHARLES M. SAVRDA

BY
Edwin Leisohn &
Harry Cohen
ATTORNEYS.

INVENTOR.
CHARLES M. SAVRDA
BY Edwin Leisohn &
Harry Cohen
ATTORNEYS.

Nov. 8, 1955 C. M. SAVRDA 2,722,711

FISH-FILLETING APPARATUS

Filed Feb. 9, 1949 20 Sheets-Sheet 5

INVENTOR.
CHARLES M. SAVRDA

BY Edwin Reisohn & Harry Cohen

ATTORNEYS.

Nov. 8, 1955 C. M. SAVRDA 2,722,711

FISH-FILLETING APPARATUS

Filed Feb. 9, 1949 20 Sheets-Sheet 6

INVENTOR.
CHARLES M. SAVRDA

BY Edwin Leirohn & Harry Cohen

ATTORNEYS.

Nov. 8, 1955 C. M. SAVRDA 2,722,711

FISH-FILLETING APPARATUS

Filed Feb. 9, 1949 20 Sheets-Sheet 7

INVENTOR.
CHARLES M. SAVRDA

BY Edwin Leinsohn & Harry Cohen
ATTORNEYS.

Nov. 8, 1955 C. M. SAVRDA 2,722,711

FISH-FILLETING APPARATUS

Filed Feb. 9, 1949 20 Sheets-Sheet 8

INVENTOR.
CHARLES M. SAVRDA

BY Edwin Leinsohn &
Harry Cohen

ATTORNEYS.

Nov. 8, 1955 C. M. SAVRDA 2,722,711

FISH-FILLETING APPARATUS

Filed Feb. 9, 1949 20 Sheets-Sheet 9

INVENTOR.
CHARLES M. SAVRDA

BY
Edwin Leisohn &
Harry Cohen
ATTORNEYS.

INVENTOR.
CHARLES M. SAVRDA
BY Edwin Leirsohn &
Harry Cohen
ATTORNEYS.

Nov. 8, 1955 C. M. SAVRDA 2,722,711

FISH-FILLETING APPARATUS

Filed Feb. 9, 1949 20 Sheets-Sheet 11

INVENTOR.
CHARLES M. SAVRDA

BY Edwin Leisohn & Harry Cohen
ATTORNEYS.

Nov. 8, 1955 C. M. SAVRDA 2,722,711

FISH-FILLETING APPARATUS

Filed Feb. 9, 1949 20 Sheets-Sheet 12

INVENTOR.
CHARLES M. SAVRDA
BY Edwin Leinohn & Harry Cohen
ATTORNEYS.

Nov. 8, 1955 C. M. SAVRDA 2,722,711

FISH-FILLETING APPARATUS

Filed Feb. 9, 1949 20 Sheets-Sheet 13

INVENTOR.
CHARLES M. SAVRDA

BY Edwin Leisohn &
Harry Cohen
ATTORNEYS.

Nov. 8, 1955 C. M. SAVRDA 2,722,711

FISH-FILLETING APPARATUS

Filed Feb. 9, 1949 20 Sheets-Sheet 14

INVENTOR.
CHARLES M. SAVRDA

BY Edwin Leirsohn & Harry Cohen
ATTORNEYS.

Nov. 8, 1955 C. M. SAVRDA 2,722,711

FISH-FILLETING APPARATUS

Filed Feb. 9, 1949 20 Sheets-Sheet 15

INVENTOR.
CHARLES M. SAVRDA

BY Edwin Leviston & Harry Cohen

ATTORNEYS.

Nov. 8, 1955 C. M. SAVRDA 2,722,711

FISH-FILLETING APPARATUS

Filed Feb. 9, 1949 20 Sheets-Sheet 16

INVENTOR.
CHARLES M. SAVRDA

BY Edwin Leisohn & Harry Cohen

ATTORNEYS.

Nov. 8, 1955 C. M. SAVRDA 2,722,711

FISH-FILLETING APPARATUS

Filed Feb. 9, 1949 20 Sheets-Sheet 17

INVENTOR.
CHARLES M. SAVRDA

BY Edwin Leisohn & Harry Cohen

ATTORNEYS.

Nov. 8, 1955 C. M. SAVRDA 2,722,711

FISH-FILLETING APPARATUS

Filed Feb. 9, 1949 20 Sheets-Sheet 18

INVENTOR.
CHARLES M. SAVRDA

BY Edwin Lerisohn & Harry Cohen
ATTORNEYS.

Nov. 8, 1955 C. M. SAVRDA 2,722,711

FISH-FILLETING APPARATUS

Filed Feb. 9, 1949 20 Sheets-Sheet 19

INVENTOR.

CHARLES M. SAVRDA

BY Edwin Leisohn & Harry Cohen

ATTORNEYS.

Nov. 8, 1955 C. M. SAVRDA 2,722,711

FISH-FILLETING APPARATUS

Filed Feb. 9, 1949 20 Sheets-Sheet 20

INVENTOR.
CHARLES M. SAVRDA
BY Edwin Leisohn & Harry Cohen
ATTORNEYS.

United States Patent Office 2,722,711

Patented Nov. 8, 1955

2,722,711

FISH-FILLETING APPARATUS

Charles M. Savrda, Brightwaters, N. Y., assignor to International Fisheries Machinery Co., Inc., New York, N. Y., a corporation Application February 9, 1949, Serial No. 75,434

10 Claims. (Cl. 17—4)

This invention relates to apparatus for removing the skeletons from fish to provide fillets.

It is the primary aim and object of the present invention to provide apparatus of this type which is simple and sturdy in construction and highly reliable in operation, and which requires for its efficient performance a minimum of skill and attention on the part of an operator.

It is another important object of the present invention to make provisions in the apparatus for filleting fish in a fashion closely approximating hand-filleting with a knife in which the latter is drawn with its cutting edge over and into the fish to incise the skin and cut the fillets from the skeleton, thereby to secure the advantages of obtaining clean cuts requiring a minimum of resistance from the fish and entailing a minimum of wear of the cutting edges of the filleting knives over a long period of use.

It is another important object of the present invention to equip the apparatus with a multitude of knives which are far in excess of the number required for filleting a fish and are mounted end to end on driven conveyor belts, so that, despite high-speed travel of these belts and accordingly advantageous slicing speed of the knives, the latter are used only in alternating groups in filleting successive fish and, in consequence, retain their sharp cutting edges for a long period of time.

It is another important object of the present invention to assign to one of the knife belts the entire task of conveying fish through the apparatus during the cutting operation, thereby dispensing with any special fish-conveying equipment and accordingly simplifying the construction, and reducing the cost, of the apparatus.

It is another important object of the present invention to make provisions in the apparatus for filleting fish in the above fashion by cutting first from the back-side and subsequently from the belly-side of the fish, thereby to facilitate the correct guidance of the fish onto the first knife belt for their impalement thereon on opposite sides of, and in close proximity to, their back spines, as well as to utilize the first knife belt in the task of correctly guiding the fish onto the second knife belt.

It is another object of the present invention to provide the apparatus with selectively usable equipment for clamping fish from opposite sides as they are guided onto the first knife belt and ramming them into the knives of the latter in correctly impaled position thereon, thereby to anchor the fish most firmly on the knife belt for their conveyance thereon.

The above and other objects, features and advantages of the present invention will be more fully understood from the following description considered in connection with the accompanying illustrative drawings.

Figure 1:
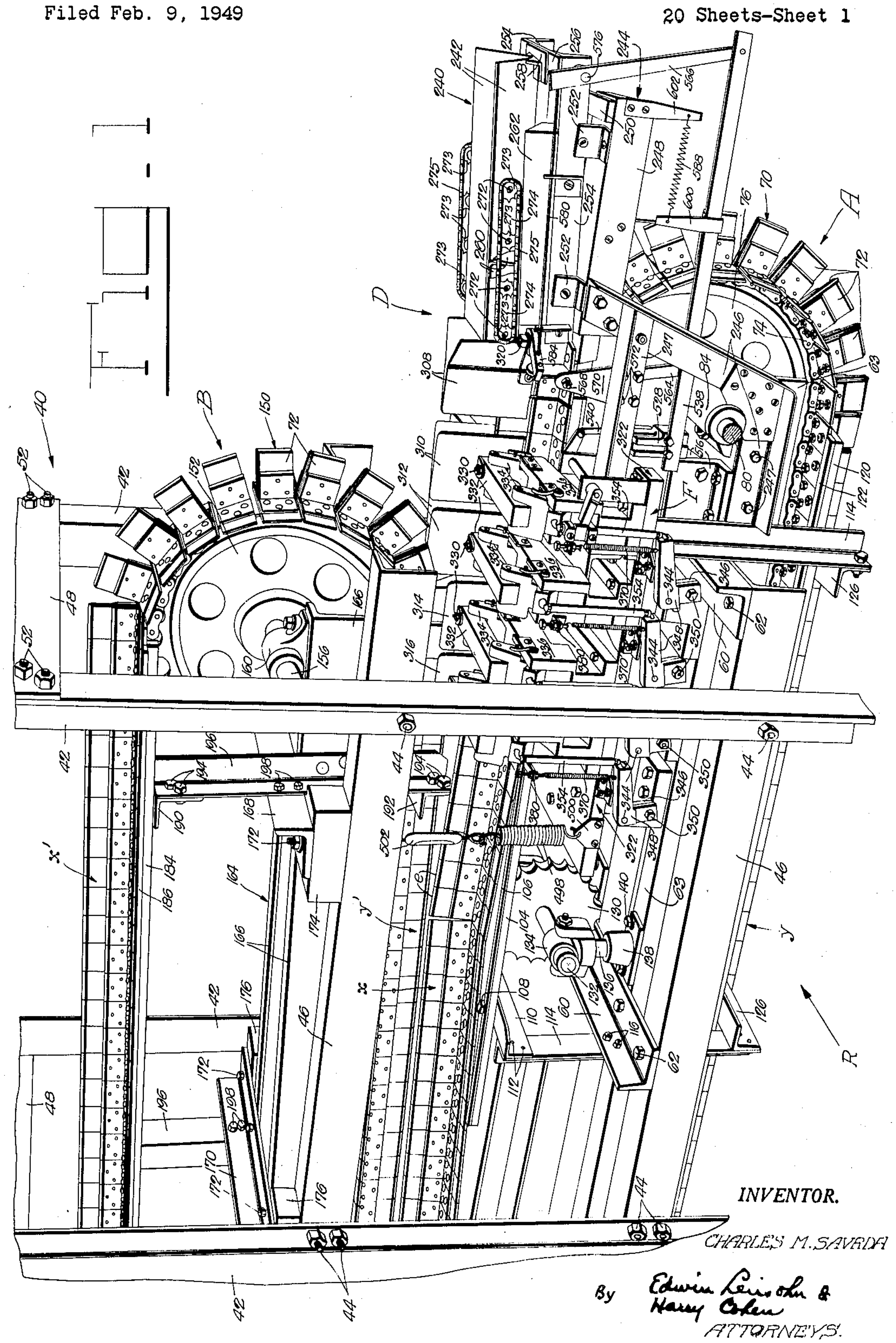
Fig. 1 is a fragmentary perspective view of apparatus embodying the present invention.
Figure 2:
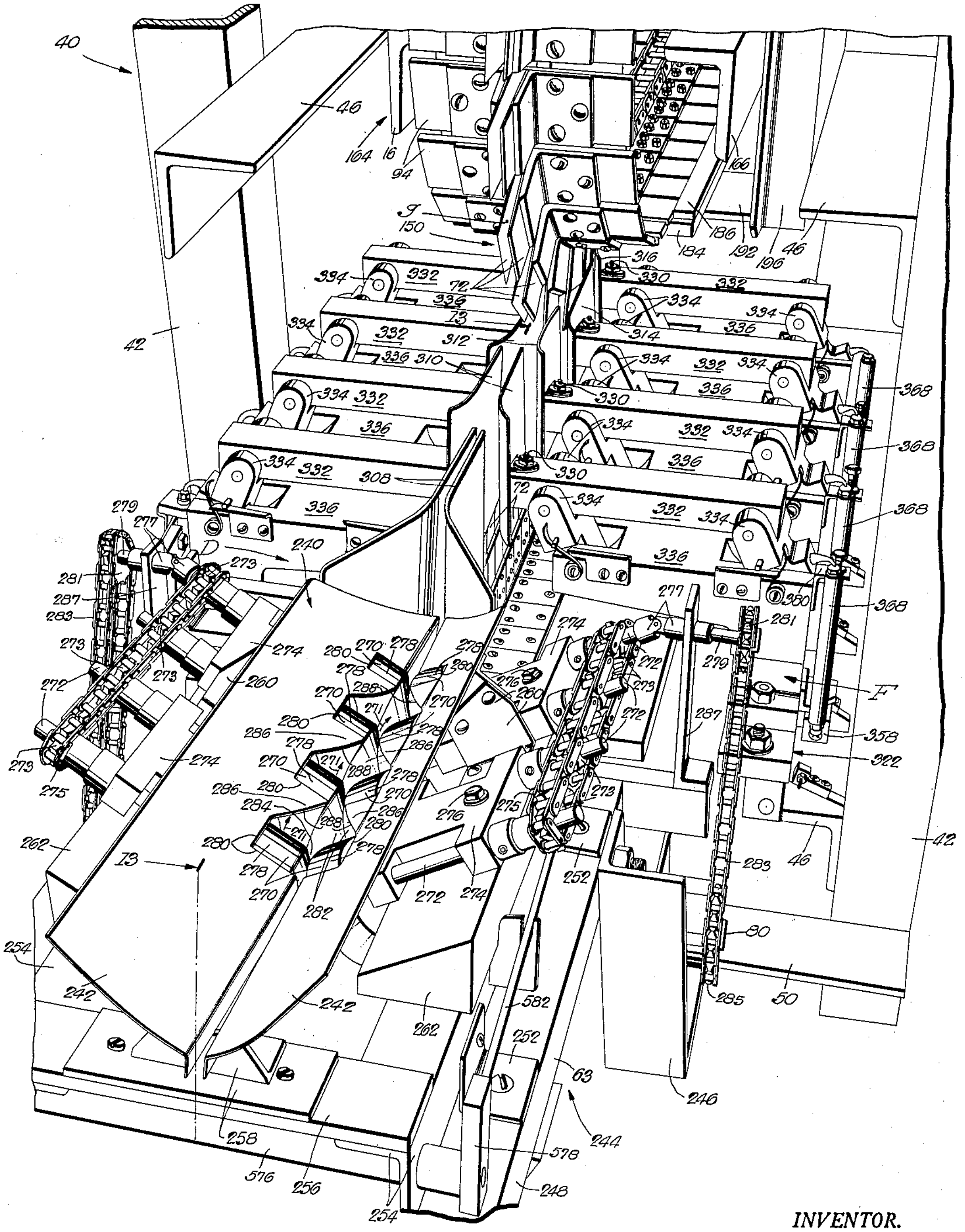
Figs. 2, 3, 4 and 5 are other fragmentary perspective views of the same apparatus.
Figure 4:
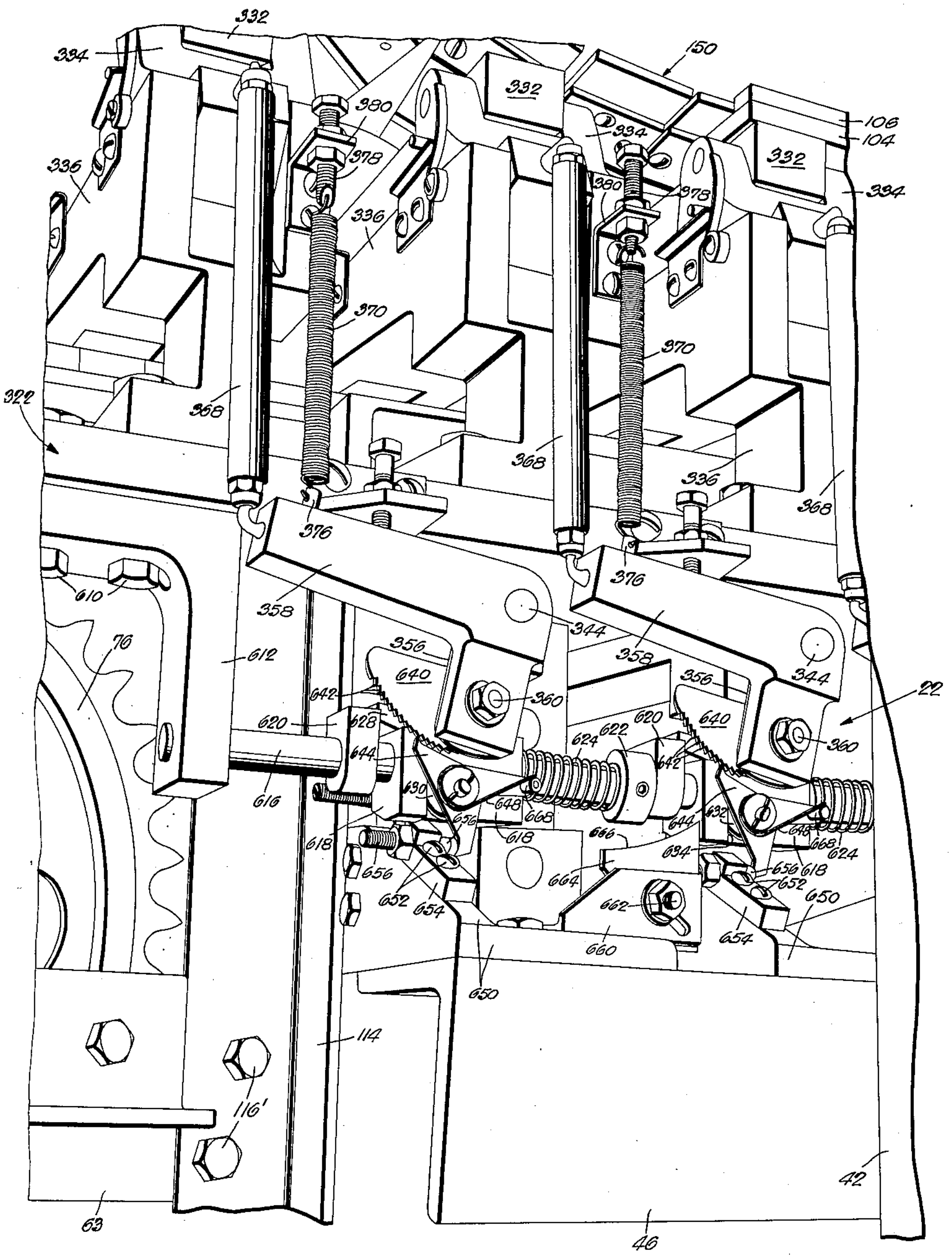
Figure 7:
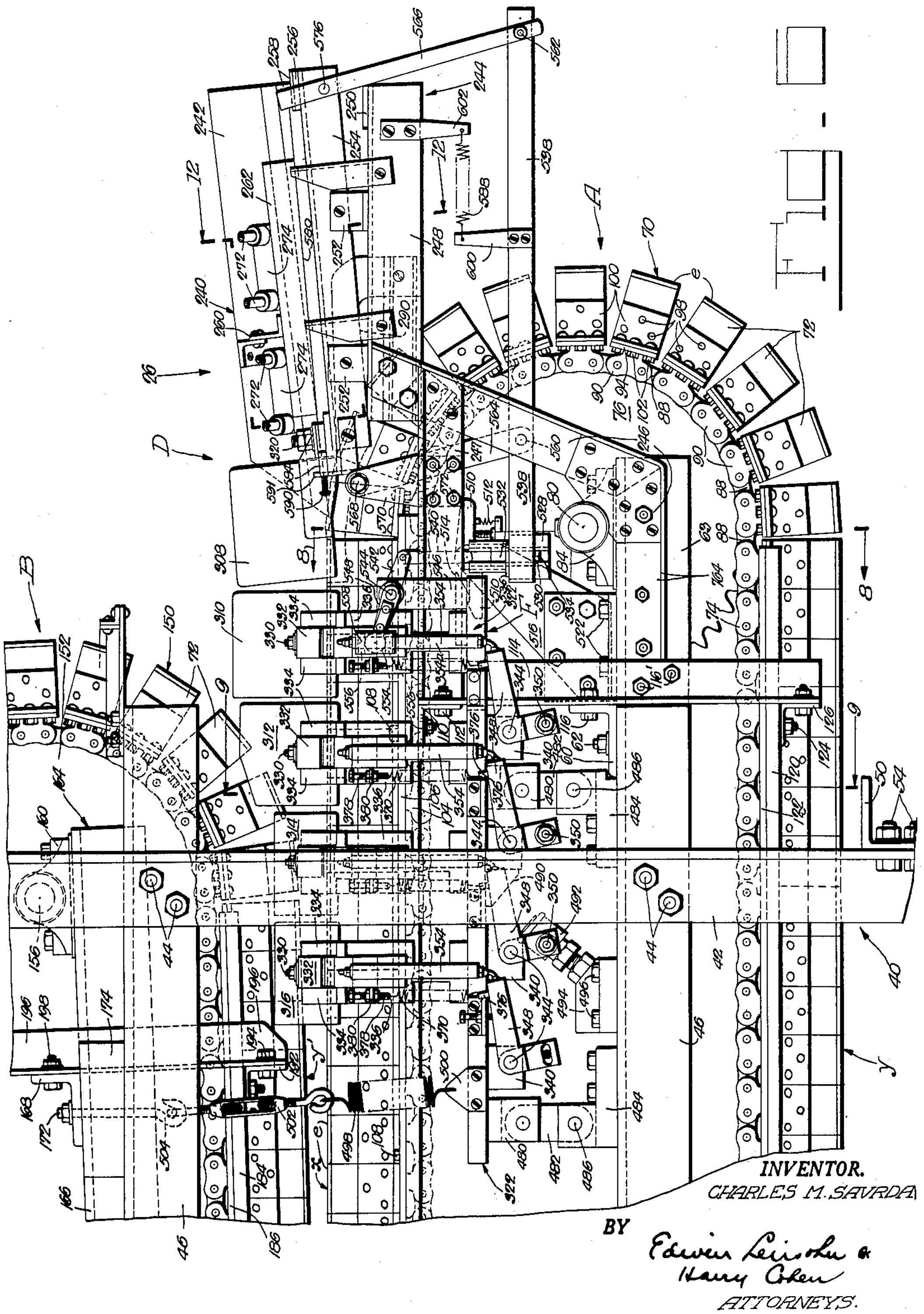
Figures 7, 7A:
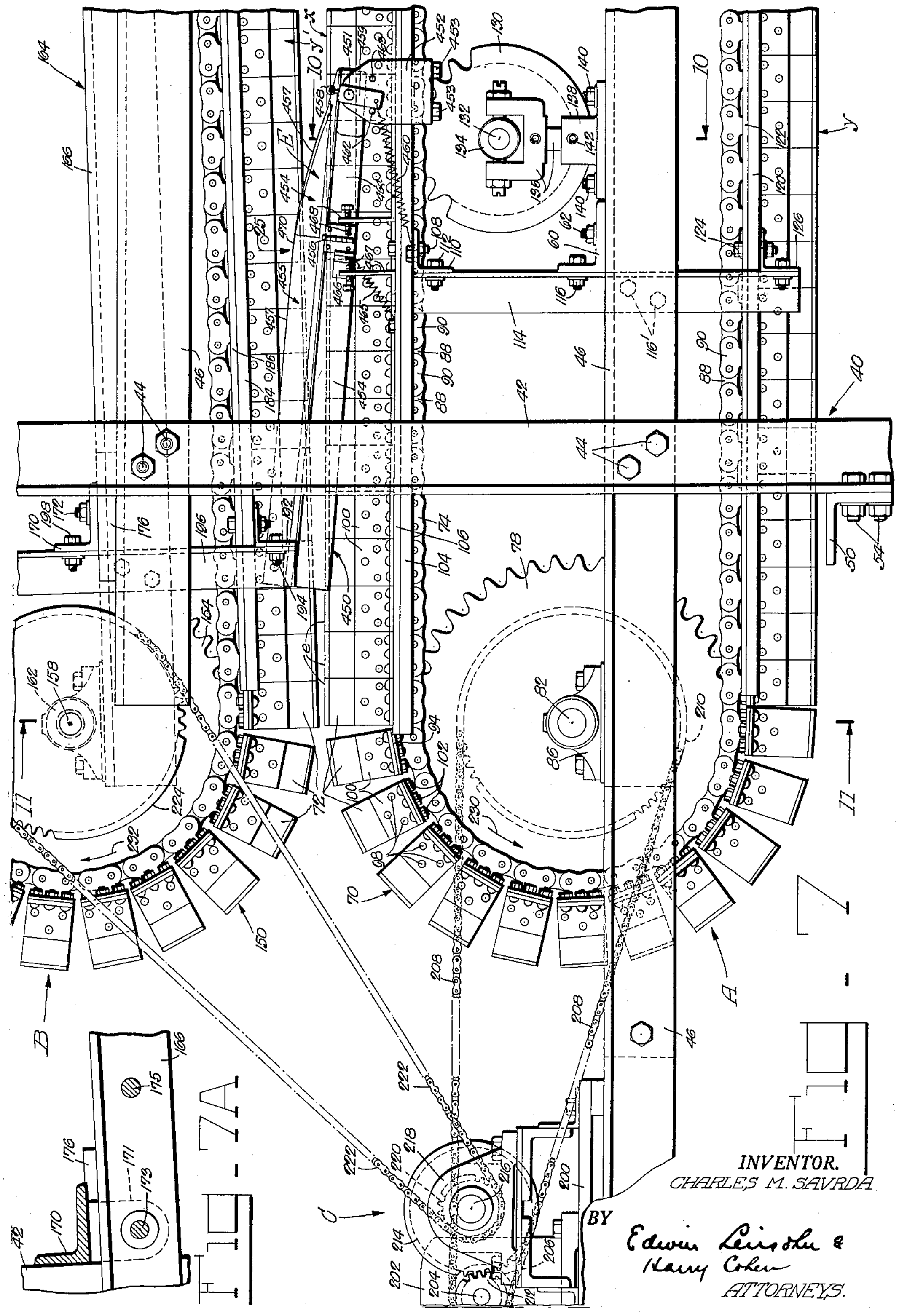
Figure 8:
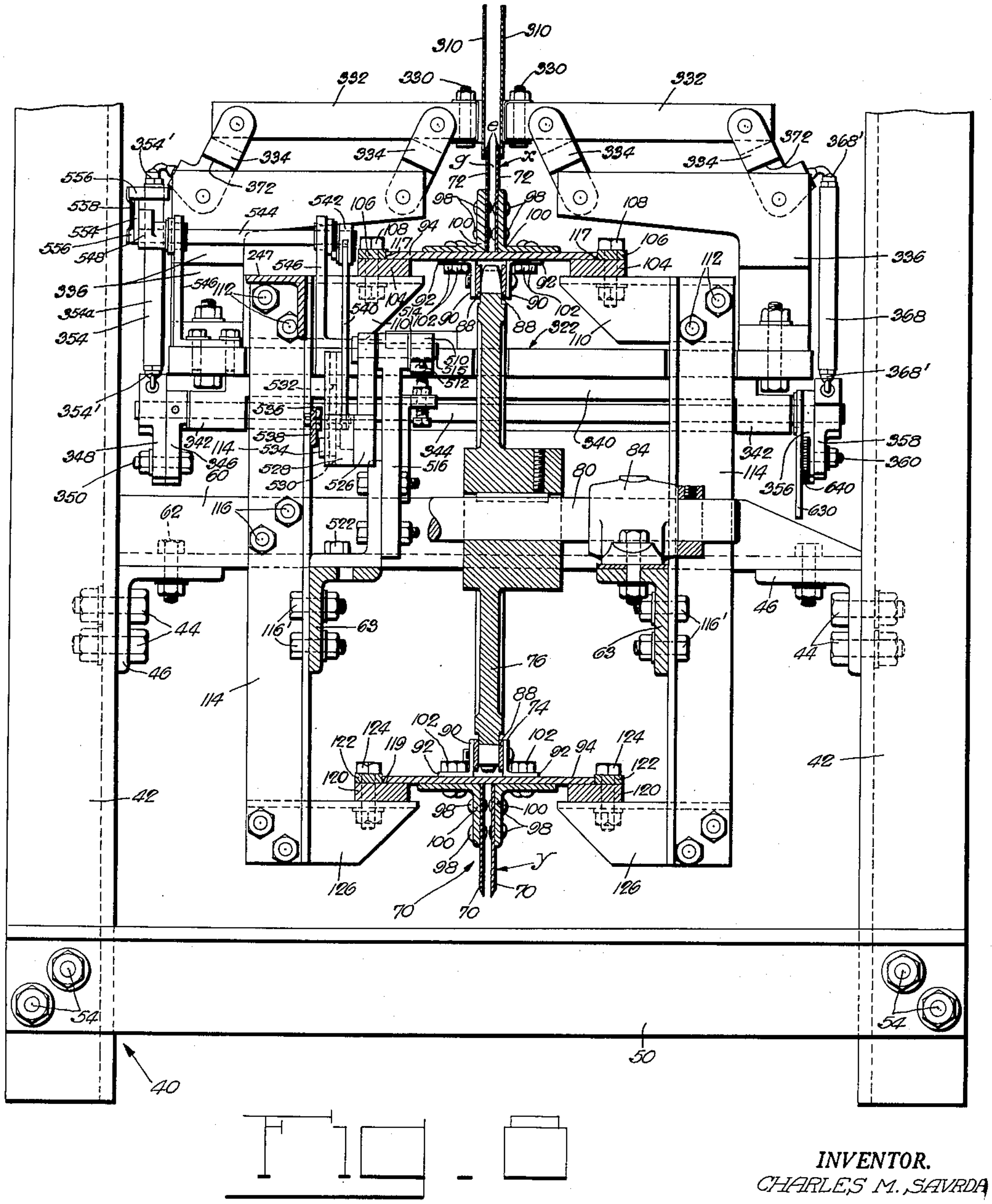
Figure 9:
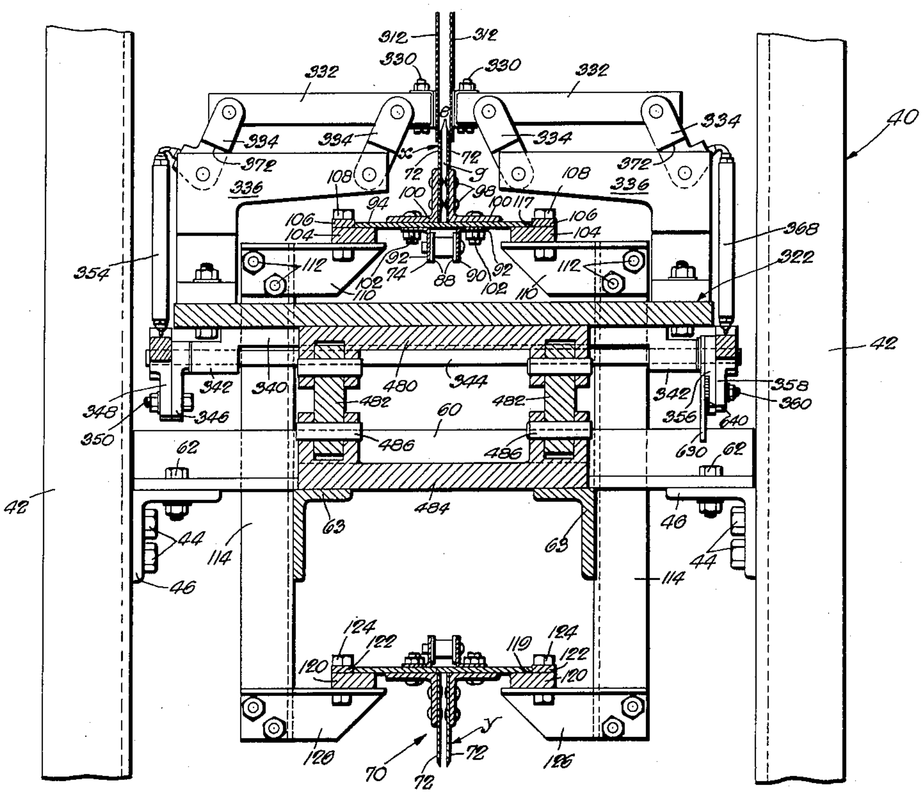
Figure 10:
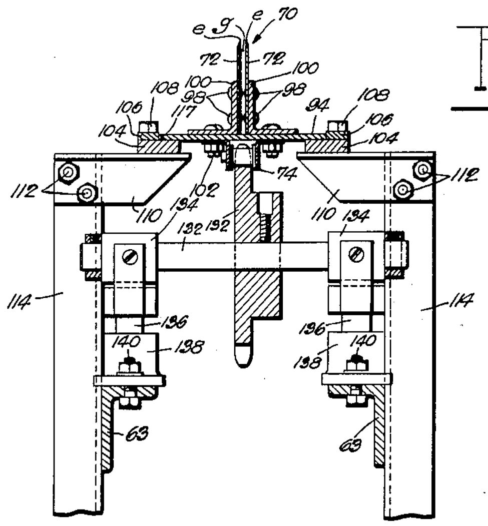
Figure 11:
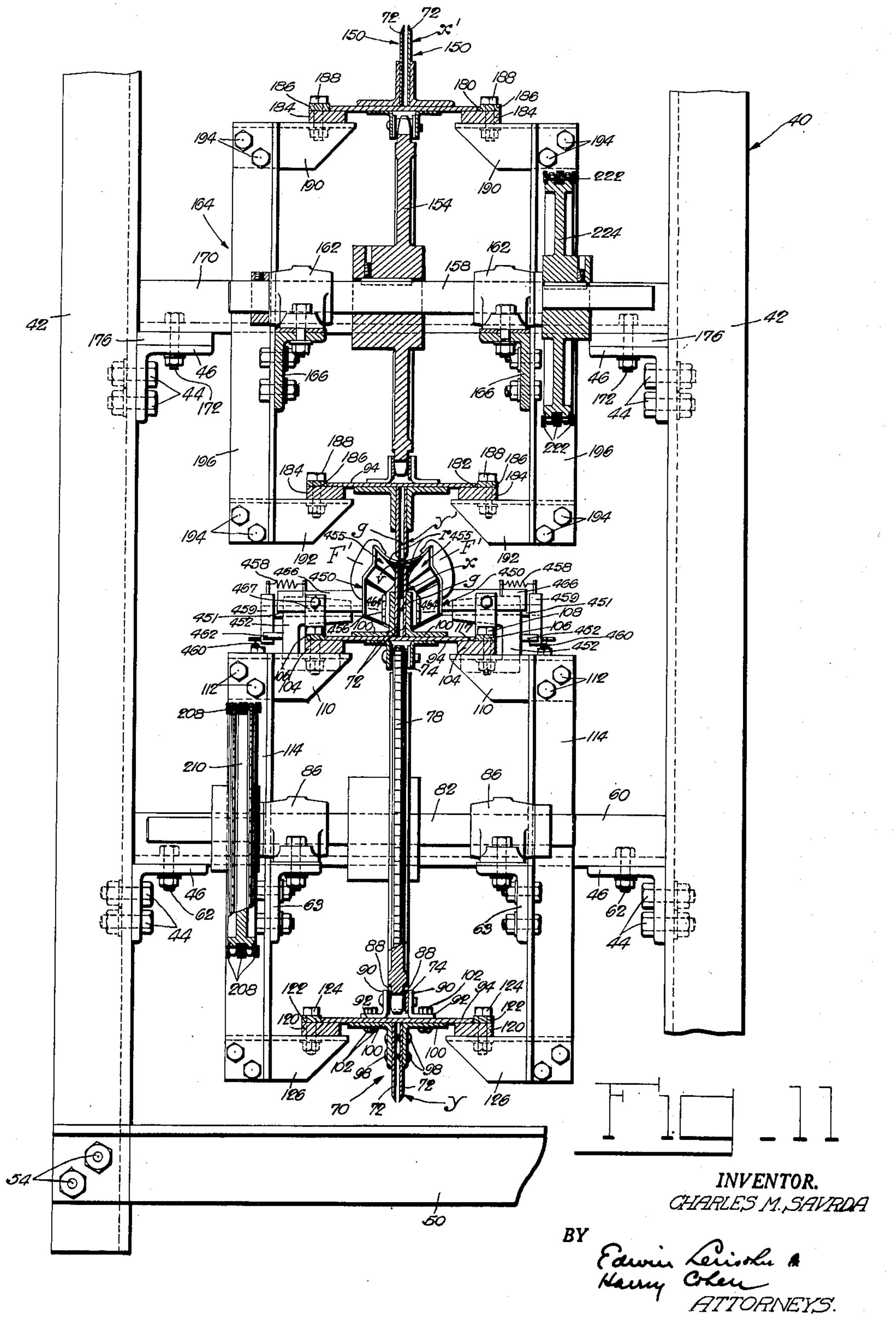
Figure 12:
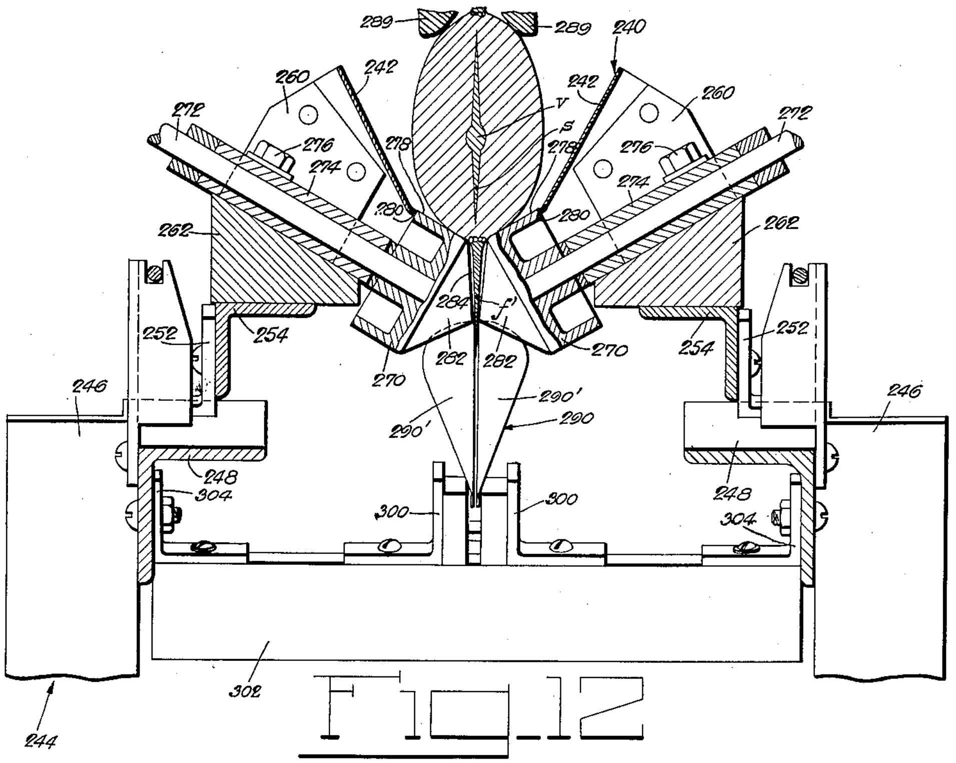
Figure 15:
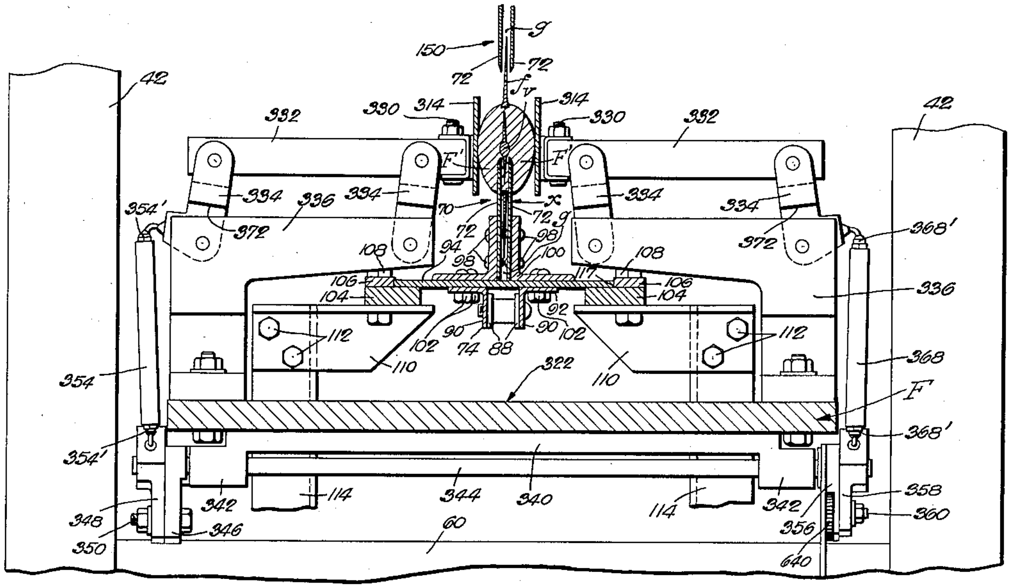
Figure 13:
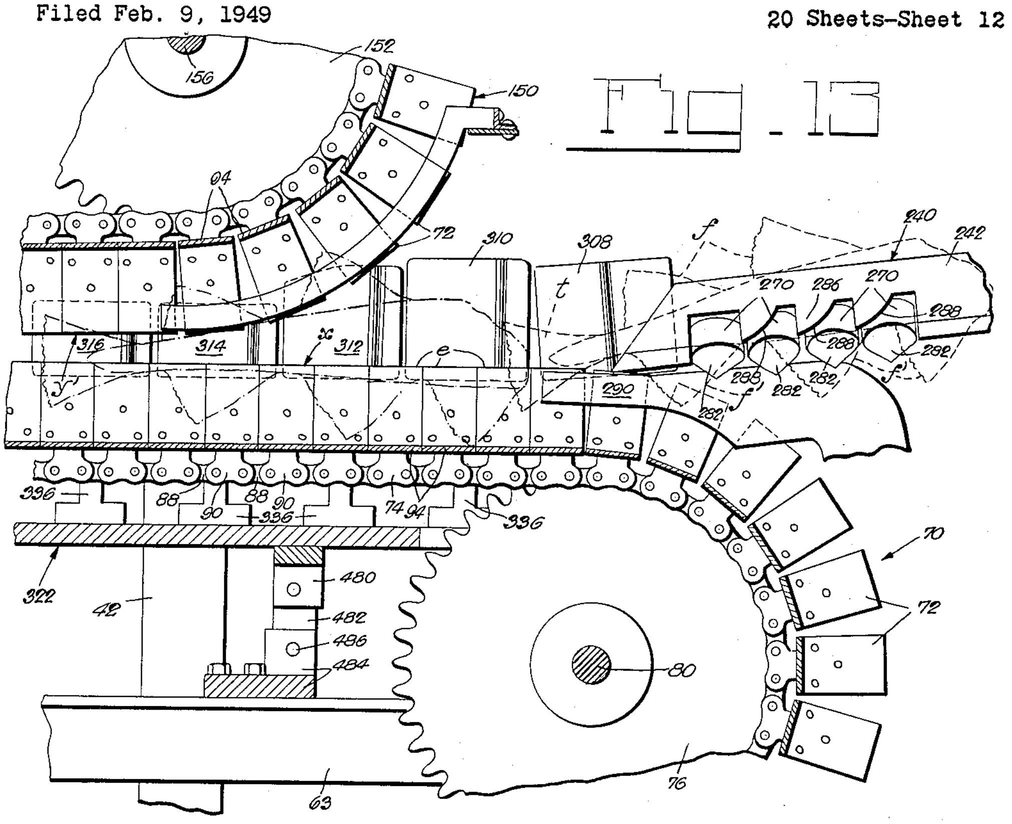
Figure 14:
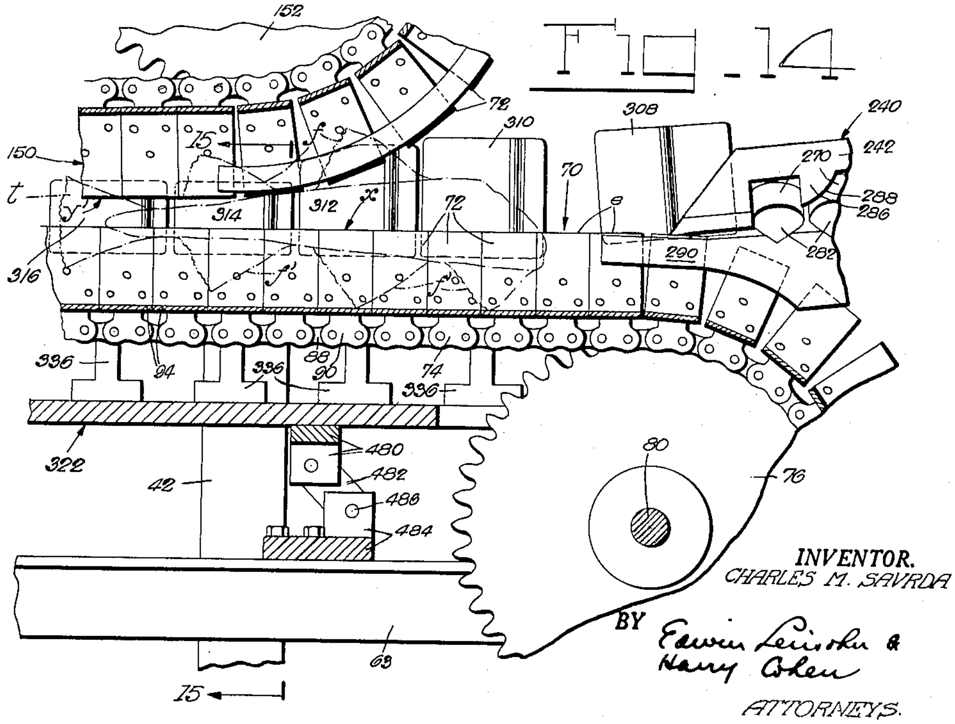
Figure 16:
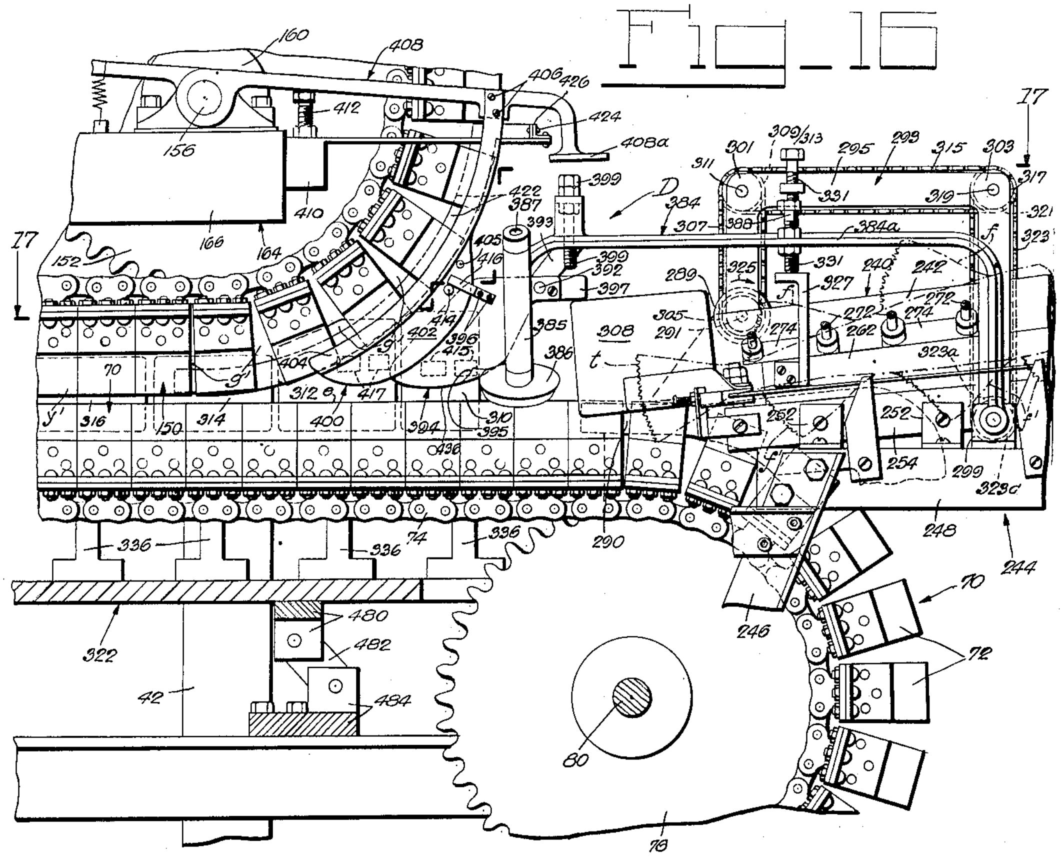
Figures 17, 17A:
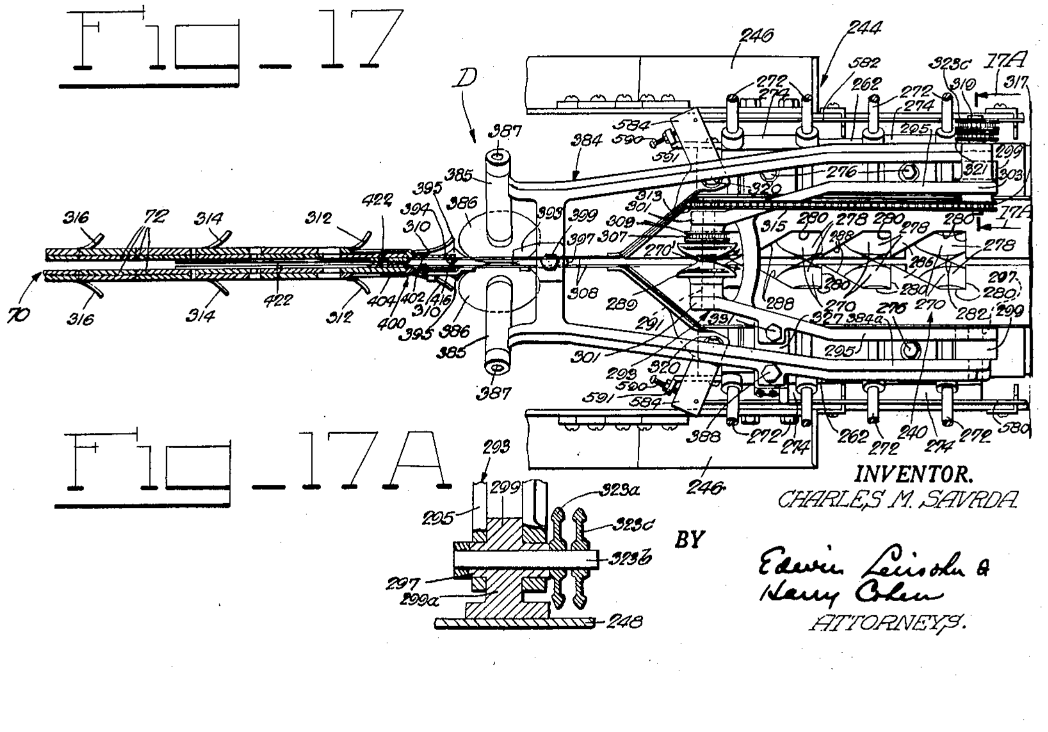
Figure 18:
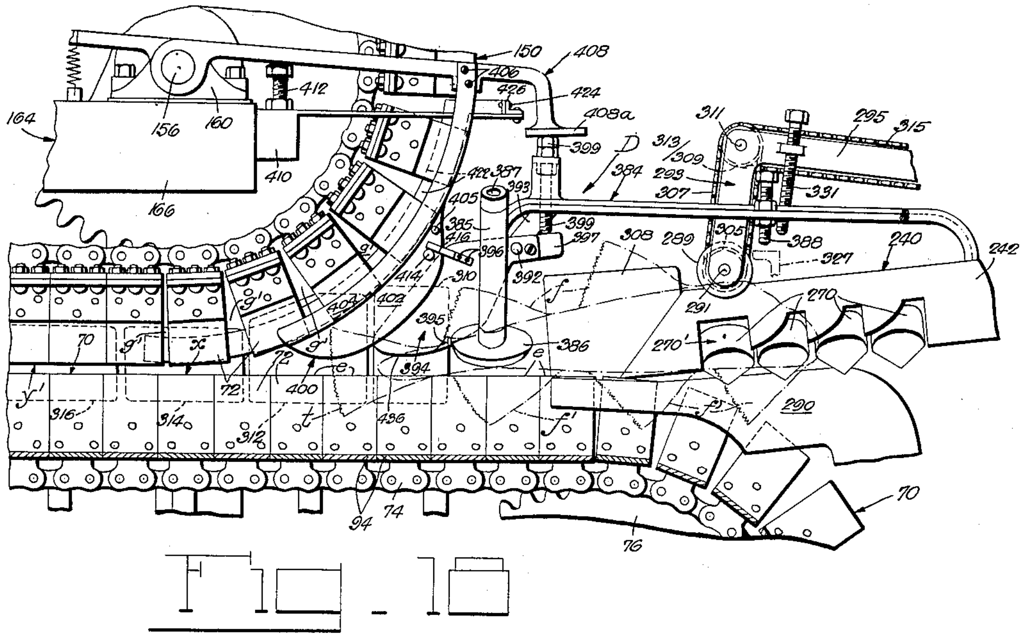
Figure 19:
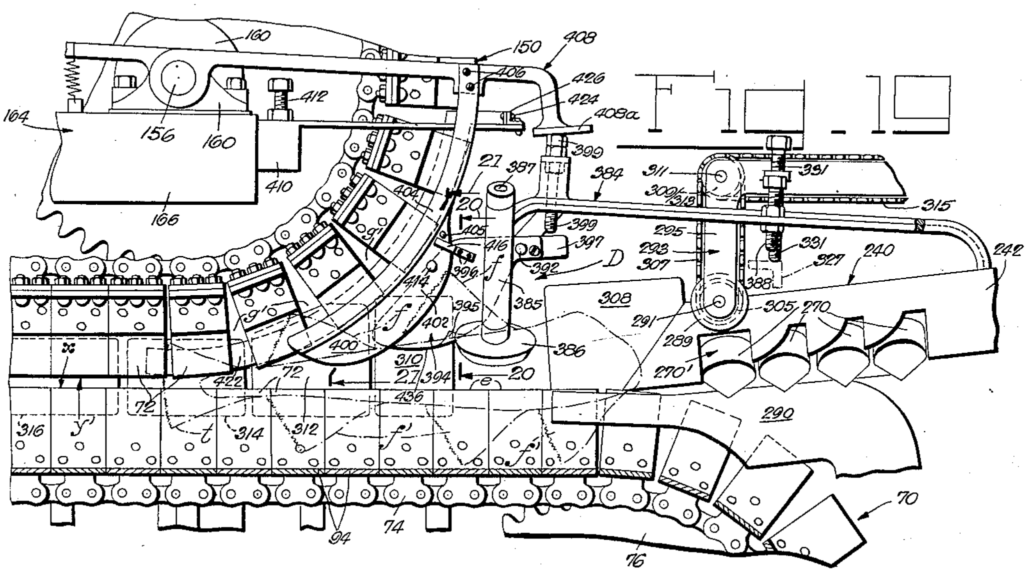
Figure 20:
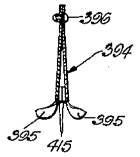
Figure 21:
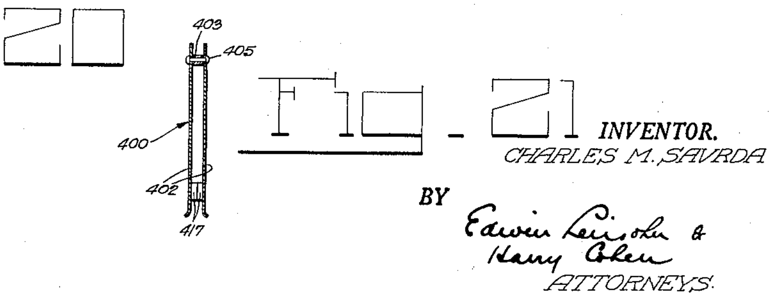
Figure 22:
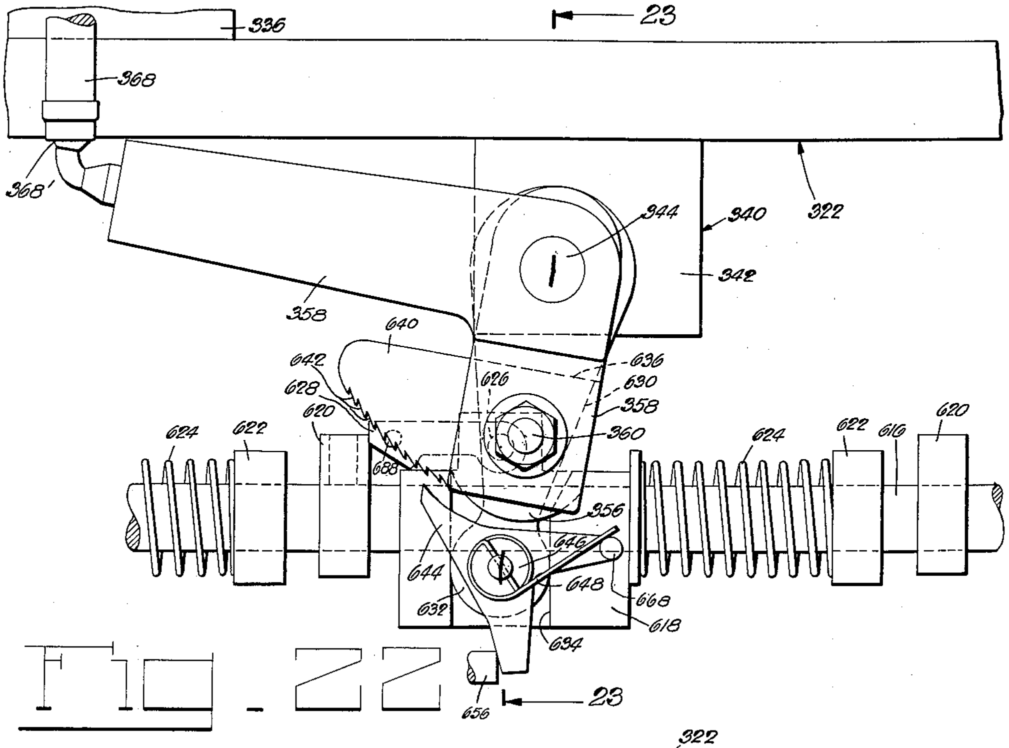
Figure 23:
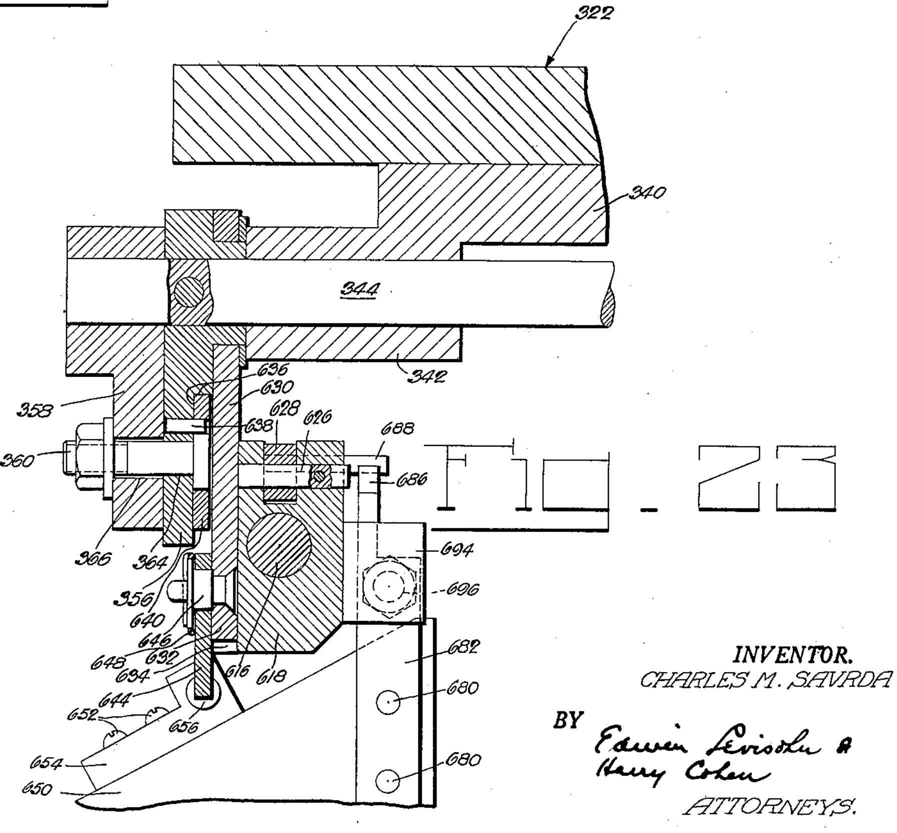
Figure 24:
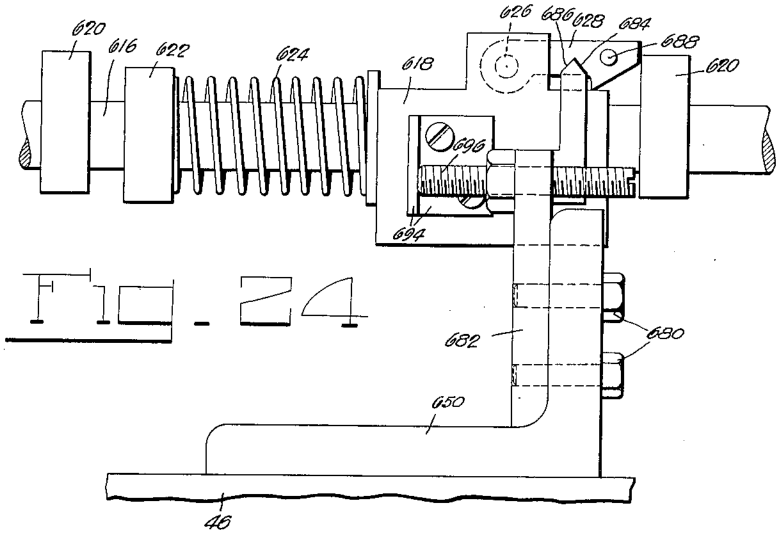
Figures 24A, 25:
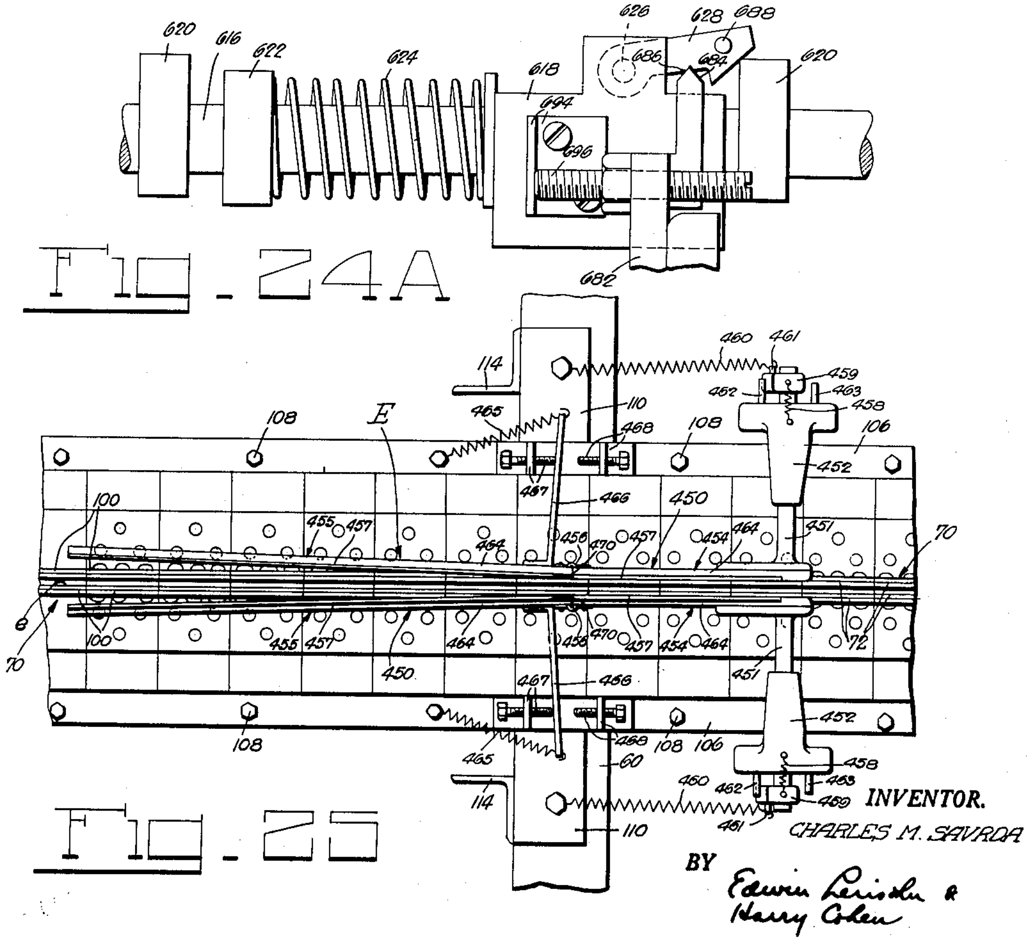
Figures 27, 28, 29:
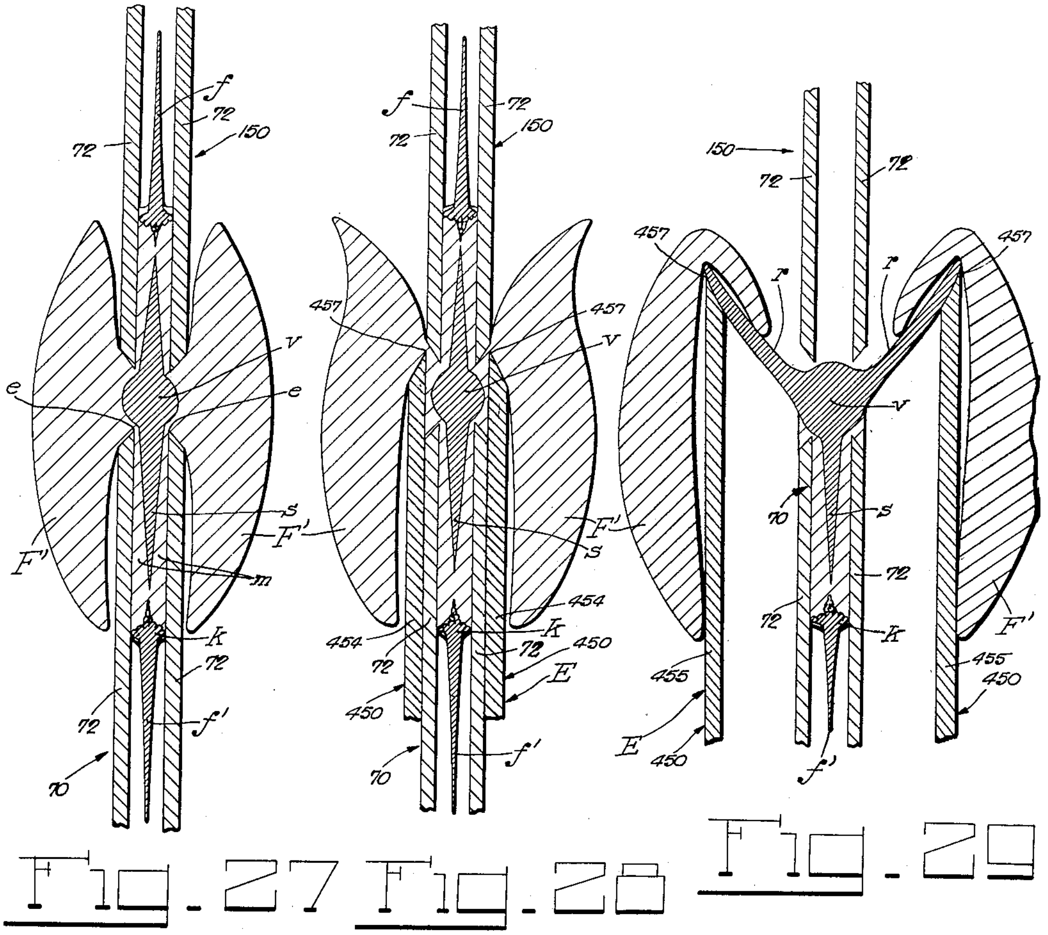
Figure 26:
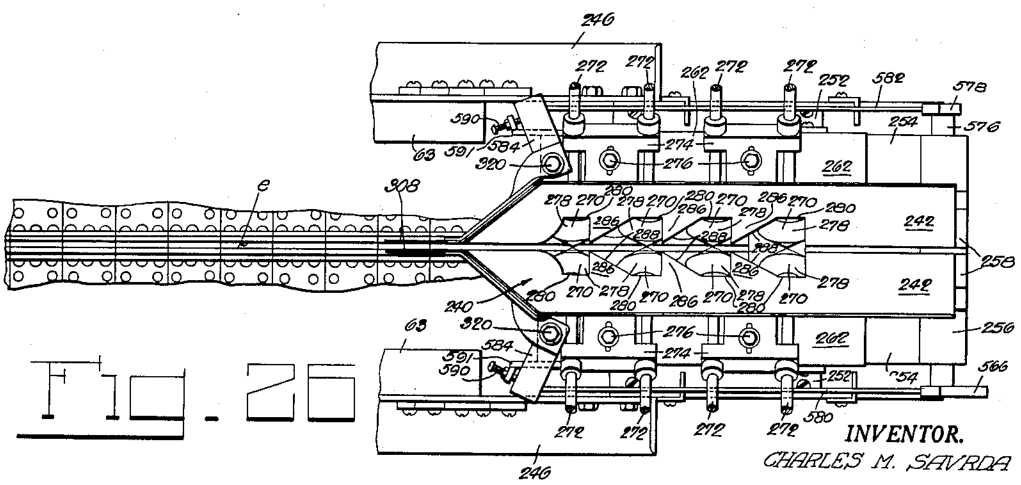
Figure 30:
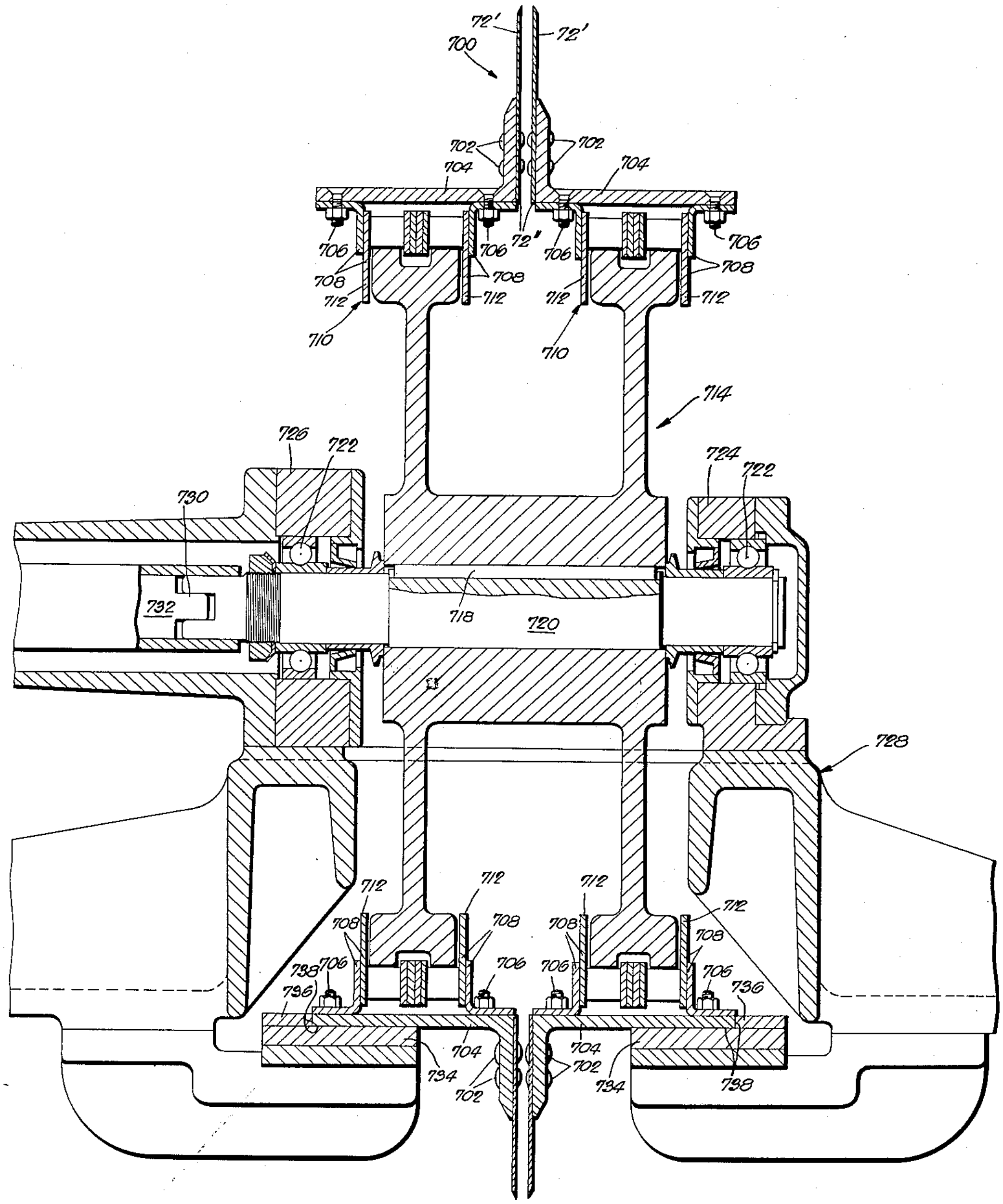
Figure 31:
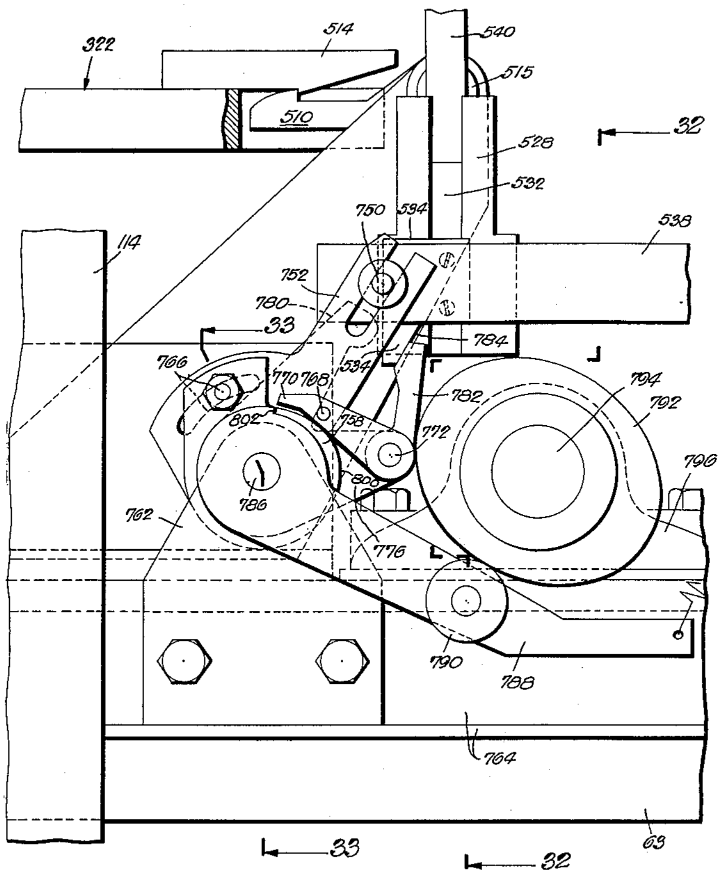
Figure 32:
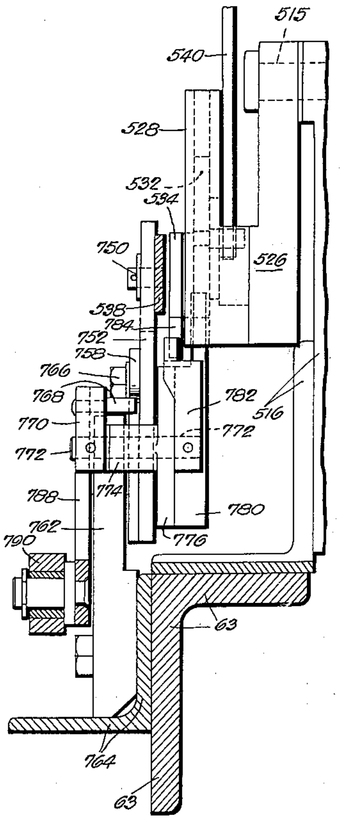
Figure 33:
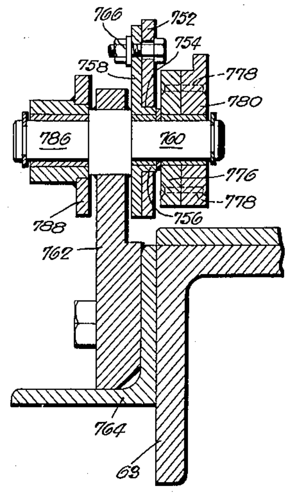
Figure 34:
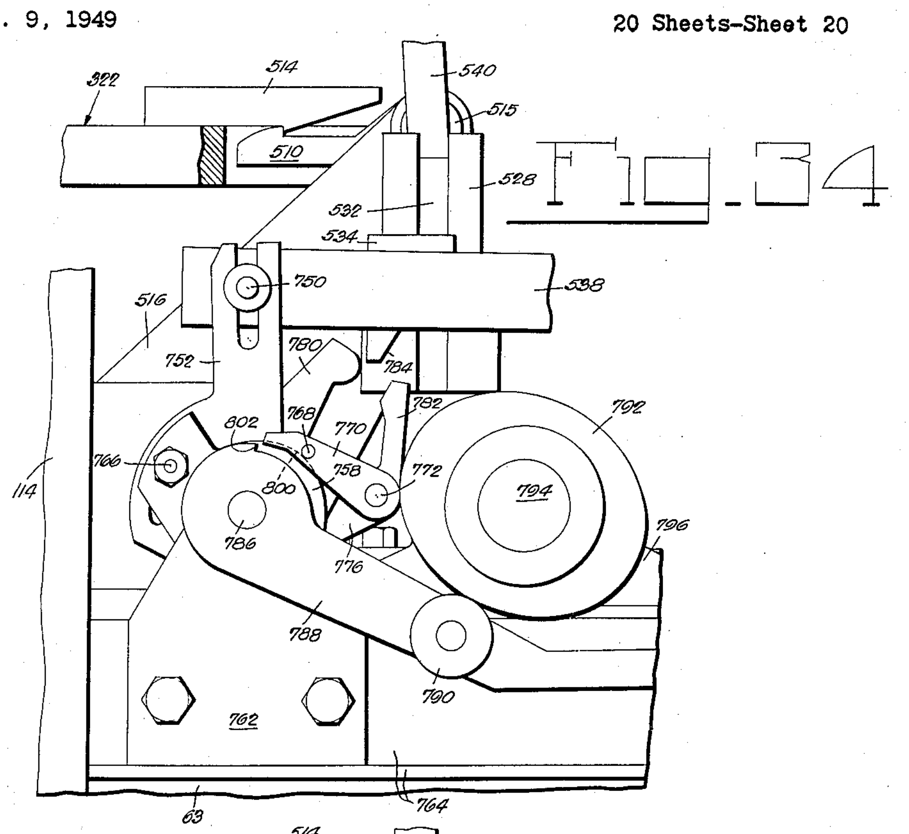
Figure 35:
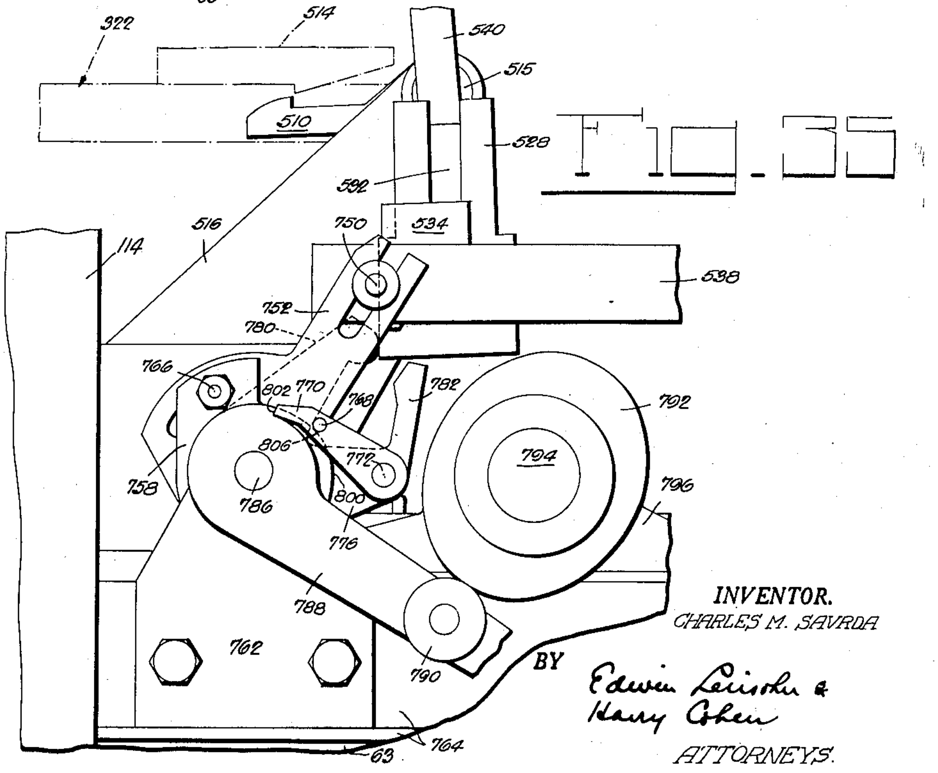

Figs. 6 and 7 combined show the apparatus in side elevation, as viewed in the direction of the arrow R in Fig. 1;

Fig. 7A is a fragmentary section showing a modified mounting for the upper knife belt of the apparatus;

Fig. 8 is an enlarged section taken on the line 8—8 of Fig. 6;

Fig. 9 is a section, on an enlarged scale, taken on the line 9—9 of Fig. 6;

Figs. 10 and 11 are sections, on an enlarged scale, taken on the lines 10—10 and 11—11, respectively, of Fig. 7;

Fig. 12 is an enlarged section, taken on the line 12—12 of Fig. 6;

Fig. 13 is a fragmentary longitudinal section through certain coordinated mechanisms of the apparatus, the section being taken substantially on the line 13—13 of Fig. 2;

Fig. 14 is a section similar to Fig. 13, but showing the coordinated mechanisms in a different operating relation;

Fig. 15 is a section taken substantially on the line 15—15 of Fig. 14;

Fig. 16 is a fragmentary side elevation, partly in section, of the apparatus with the feed roll lever shown in its lowermost position;

Fig. 17 is a section taken on the line 17—17 of Fig. 16;

Fig. 17A is an enlarged fragmentary section taken on the line 17A—17A of Fig. 17;

Figs. 18 and 19 are views similar to Fig. 16, showing advanced positions of the fish in the apparatus;

Figs. 20 and 21 are sections taken on the lines 20—20 and 21—21, respectively, of Fig. 19;

Fig. 22 is an enlarged side elevational view of fish clamping mechanism viewed in the direction of the arrow 22 in Fig. 4;

Fig. 23 is a section taken on the line 23—23 of Fig. 22;

Fig. 24 is a fragmentary rear elevation of parts of the fish clamping mechanism shown in front elevation in Fig. 22;

Fig. 24A is a view similar to Fig. 24, but showing the parts of the fish clamping mechanism in a different operative position;

Fig. 25 is a fragmentary plan view of part of the apparatus as viewed in the direction of the arrow 25 in Fig. 7;

Fig. 26 is another fragmentary plan view of part of the apparatus as viewed in the direction of the arrow 26 in Fig. 6;

Figs. 27, 28 and 29 are sectional views illustrating progressive steps in filleting a fish in the instant apparatus;

Fig. 30 is a fragmentary section through modified knife belt structure of the apparatus;

Fig. 31 is a fragmentary side-elevational view of a modified form of tripping device of the apparatus;

Figs. 32 and 33 are sections taken on the lines 32—32 and 33—33, respectively, of Fig. 31; and Figs. 34 and 35 are views similar to Fig. 31, showing the modified tripping device in different operating positions.

Referring to the drawings, and more particularly to Figs. 1, 6 and 7 thereof, the reference numeral 40 designates the main frame of the apparatus which, in the present instance, comprises spaced pairs of upright posts 42 to which are secured in any suitable manner, as by bolts 44, substantially horizontally extending side rails 46. The posts 42 and side rails 46 may conveniently be in the form of angles. The frame 40 is provided across each pair of posts 42 with braces 48 and 50 which may conveniently be bolted to the latter as at 52 and 54, respectively. The frame 40 further comprises spaced transverse mounting angles 60 which are suitably secured to the lower side rails 46 as by bolts 62, for instance, and from which are suitably suspended intermediate rails 63 (Figs. 8 and 11).

Carried by the frame 40 are the various operating mechanisms and devices of the apparatus which may be entitled: "Lower knife belt A" (Figs. 1, 6 and 7); "Upper knife belt B" (Figs. 1, 6 and 7); "Belt drive C" (Fig. 7); "Initial fish-guiding means D" (Figs. 1, 2, 6 and 16 to 19, inclusive); "Ribbing knives E" (Figs. 7, 25, 28 and 29), and "Fish-impaling mechanism F" (Figs. 1, 2, 6 and 15).

*Lower knife belt A*

Referring now to Figs. 1, 6 and 7, there is shown the lower knife belt 70 which comprises a multitude of cutting knives 72 on a chain 74 which passes over front and rear sprockets 76 and 78, respectively. The sprockets 76 and 78, which are spaced longitudinally of the apparatus, are mounted on shafts 80 and 82, respectively, which are journaled in suitable bearing brackets 84 and 86, respectively, on the intermediate rails 63 of the frame 40 (Figs. 6, 7, 8 and 11). The chain 74 comprises conventional links 88 and special links 90 which alternate with the links 88. The special links 90 are provided with laterally extending flanges 92 on which the knives 72 are mounted (Fig. 8). More particularly, the flanges 92 of each pair of opposite links 90 of the chain 74 are adapted to carry associated knives 72, respectively, mounting members 100 therefor, as well as a plate slide 94. Thus, the associated knives 72 of each pair are suitably secured, as by rivets 98, for instance, to the spaced members 100 which are, together with a plate slide 94, mounted on the flanges 92, respectively, of a pair of coordinated links 90 by means of bolts 102, for instance.

For reasons which will become obvious hereinafter, it is imperative that the top run *x* of the knife belt 70 extends linearly and must not be permitted to sag. To this end, there are provided laterally spaced rails 104 and guide bars 106 (Figs. 6 to 8), which are mounted, as by bolts 108, on spaced pairs of angle brackets 110 that are, in turn, mounted at 112 to upright angles 114, suitably bolted at 116 and 116' to the mounting angles 60 and the intermediate rails 63, respectively. The rails 104 and guide bars 106 together form a track 117 in which the top run *x* of the knife belt 70 travels in a linear direction. The track 117 is also advantageous in that it supports the very substantial weight of the top run *x* of the knife belt 70, thereby reducing the possibility of breakage of any of the links of the chain 74 to a minimum. It is for this same reason that an additional track 119 is provided for the bottom run *y* of the knife belt 70. This additional track 119 is, like the track 117, formed by spaced rails 120 and guide bars 122, which are mounted at 124 on brackets 126 on the angles 114 (Figs. 4 to 8).

For reasons hereinafter explained, it is desirable to have facilities for raising the top run *x* of the knife belt 70 intermediate its ends, as shown in Fig. 1. To this end, there is provided an idler sprocket 130 (Figs. 7 and 10) over which the top run *x* of the chain 74 passes, and which is carried by a shaft 132, journalled with its ends in suitable bearings 134, respectively, which are carried by the rams 136 of any suitable jacks 138, respectively, mounted at 140 on the intermediate rails 63, respectively. The jacks 138 may be of the simplest possible form, using merely set screws 142 for holding their respective rams 136 in vertically adjusted position.

*Upper knife belt B*

Referring now to Figs. 1, 6, 7 and 11, there is shown the upper knife belt 150 which in its construction is exactly like the lower knife belt 70 and, hence, requires no further descrpition. The upper knife belt 150 is passed over front and rear sprockets 152 and 154, respectively, which are spaced longitudinally of the apparatus and carried by shafts 156 and 158, respectively, journaled in suitable bearing brackets 160 and 162, respectively, on an auxiliary frame 164. The auxiliary frame 164 consists, in the present instance, of laterally spaced rails 166 which extend longitudinally of the apparatus and are joined by spaced transverse angle braces 168 and 170. The braces 168 and 170 extend with their ends beyond the rails 166 and are secured, as by bolts 172, to blocks 174 and 176, respectively, on the side rails 46. The blocks 174 are made higher than the blocks 176 for the intended purpose of disposing the upper knife belt 150 in the inclined fashion shown in Figs. 6 and 7.

While the auxiliary mounting frame 164 for the upper knife belt 150 has been described as being fixedly held in place, it is also contemplated to have the knife belt 150 mounted in the vicinity of the angle brace 170 for swinging movement to and from the lower knife belt 70. To this end, the angle brace 170 may be provided with spaced depending lugs 171 (Fig. 7A), carrying a shaft 173 on which the rails 166 are pivoted. The rails 166 may, in the neighborhood of the shaft 173 be reenforced by a transverse brace 175. Of course, the bolts 172 are then removed from the other brace 168 to release the frame 164 from the blocks 174 for pivotal movement of the former about the shaft 173. Preferably, the blocks 174 are removed from the side rails 46 of the main frame 40 to permit swinging of the frame 164 into the position shown in Fig. 16, in which the knife belts 70 and 150 extend substantially parallel and in close proximity to each other, any suitable adjustable stop (not shown) being preferably provided to limit the downward swing of the frame 164. If the upper knife belt 150 is arranged in the swingable manner just described, it may be advisable to apply to the frame 164 near the front sprocket 152 thereon a spring (not shown) to take up any desired portion of the weight of the frame 164 and the structure carried thereon.

As in the case of the lower knife belt 70, the top and bottom runs *x'* and *y'* of the upper knife belt 150 slide in tracks 180 and 182, respectively, which are formed by spaced rails 184 and guide bars 186 (Figs. 1, 6, 7 and 11). The rails 184 and guide bars 186 of the tracks 180 and 182, respectively, are bolted or otherwise secured at 188 to pairs of angle brackets 190 and 192, respectively, which are mounted at 194 on spaced upright angles 196 that are, in turn, mounted at 198 on the angle braces 168 and 170, respectively, of the frame 164.

The upper knife belt 150 has sufficient slack to permit the bottom run *y'* thereof to yield, upwardly as viewed in Figs. 6, 7 and 11, at any point where the same performs its cutting operation on a fish being conveyed on the lower knife belt 70. This slack in the upper knife belt is sufficient to permit the bottom run *y'* thereof to yield and accommodate itself to different sizes of vertebrae of successive fish being simultaneously cut by the knives in the upper belt 150 as they are conveyed on the lower knife belt, permitting thereby the knives in the upper belt 150 to cut into the fish up to the vertebrae regardless of the size of the fish.

While the vertical alignment of the rear sprockets 78 and 154 of the knife belts 70 and 150, respectively, is permissible for filleting small size fish (Fig. 7), it is advisable and even imperative to offset the upper rear sprocket 154 relative to the other rear sprocket 78 rearwardly longitudinally of the apparatus, in order to extend the yieldability of the bottom run *y'* of the upper knife belt 150 throughout the longitudinal extent of the lower knife belt 170.

*Belt drive C*

Referring now to Fig. 7, there is suitably carried on the rearwardly extending ends of the side rails 46 of the main frame 40 a platform 200 on which is mounted an electric motor 202, having a driven shaft 204 that carries a sprocket 206, drivingly connected by a chain 208 with a sprocket 210 on the shaft 82 of the rear sprocket 78 of the lower knife belt 70. The shaft 204 of the motor 202 carries also a gear 212 which is in permanent mesh with a larger gear 214 on a shaft 216, journalled in a suitable bearing bracket 218 on the platform 200. Also carried by the shaft 216 is a sprocket 220 which, through a chain 222, is drivingly connected with a sprocket 224 on the shaft 158 of the rear sprocket 154 of the upper knife belt 150. The shaft 204 of the motor 202 is driven in a direction to turn the sprockets 78 and 154 of the knife belts 70 and 150, respectively, in the direction of the arrows 230 and 232, respectively (Fig. 7), so that the knives 72 in the top and bottom runs *x* and *y'* of the lower and upper belts 70 and 150, respectively, travel from the front to the rear of the apparatus.

The upper knife belt 150 travels, in the present instance, at a lower rate of speed than the lower knife belt 70, due to the provision of the reduction gears 212 and 214 in the drive of the upper knife belt 150. It is to be understood, however, that equally good, and in some instances even better, results have been obtained in filleting fish, by running the upper knife belt 150 at a higher rate of speed than the lower knife belt 70. Thus it falls fully within the scope of this invention to select the travel speeds of the upper and lower knife belts 150 and 70 at will, but it is, for a reason described hereinafter, an important aspect of this invention to select different travel speeds for these knife belts.

*Initial fish-guiding means D*

Referring now to Figs. 1, 2, 6, 12, 16 and 26, there is shown an inclined chute 240 in which fish are moved in successive order, tail first and belly-side up as in Fig. 13, onto the knives in the lower belt 70, while certain guides to be described engage the tails *t* and the belly fins *f*, as well as the back fins *f'* of the fish and guide them into the gap *g* (Fig. 11) between oppositely spaced knives 72 in the upper belt 150 and the lower belt 70, respectively. The chute 240 comprises two separate sections 242 which are arranged in the flared fashion shown in Figs. 2 and 12, and are narrowly spaced at the bottom for the passage of the back fins of the fish. The chute 240 is mounted on a framework 244 on the main frame 40. The framework 244 comprises, in the present instance, upwardly and forwardly extending angle brackets 246 which are mounted at 247 on the forward ends of the intermediate rails 63, respectively, of the main frame 40 (Figs. 1, 6 and 26), and carry at their upper ends forwardly extending angles 248, respectively. The angles 248 are joined at their forward ends by a transverse brace 250 (Figs. 1, 2 and 6). Mounted by means of brackets 252 on the angles 248, respectively, are inclined supporting angles 254, respectively, which are joined at their forward ends by a transverse brace 256 on which is mounted a bracket 258 to which the chute sections 242 are suitably secured at their rearward ends (Figs. 1, 2 and 26). The chute sections 242 are further mounted near their other ends on brackets 260, respectively, which are, in turn, suitably mounted on blocks 262 on the supporting angles 254, respectively (Figs. 1, 2, 6, 12 and 26).

Fish placed by hand into the chute 240 in the correct disposition therein and prepared for filleting in the apparatus, i. e., tail first and belly-side up with their heads and entrails removed, are adapted to be power-fed toward and onto the knives 72 in the lower belt 70. To this end, there are provided several pairs of cooperating feed rolls 270 (Figs. 2, 12, 17, 18 and 26) which are arranged in two opposite groups. The feed rolls 270 of each group are, in pairs, journaled with their shafts 272 in bearing brackets 274, respectively, which are secured at 276 on the adjacent blocks 262, respectively (Figs. 2, 12 and 26). The feed rolls in the opposite groups are disposed in the inclined fashion shown in Figs. 2 and 12, and slightly project with their cylindrical peripheries 278 into the chute 240 through notches 280 therein. The conical bottoms 282 of each pair of cooperating feed rolls 270 have a V-shaped bite 284 (Fig. 12) into which the tails *t* and back fins *f'* of the fish project for their propulsion and for guidance by the driven feed rolls toward the knives in the lower belt 70. The fish passing through the chute 240 rest with their backs on the cylindrical peripheries 278 of the driven rolls 270 (Fig. 12) and are, when pressed thereagainst, fed toward the discharge end of the chute. The notches 280 in each chute section 242 are cut so as to leave on the latter intermediate guide flaps 286 (Figs. 2 and 26), having inclined edges 288 that are adapted to redirect into the next cooperating rolls 270 fish tails and/or back fins which accidentally swerved from their intended linear path through the chute 240.

The rolls 270 are power-driven in the direction of the arrows 271 in Fig. 2. To this end, the shafts 272 of the rolls 270 in each group carry sprockets 273, respectively (Figs. 1 and 2), over which is passed a chain 275. The shaft 272 of one of the rolls 270 in each group is further drivingly connected by a universal joint 277 with a stub shaft 279, carrying a sprocket 281 which, through a chain 283, is drivingly connected with a sprocket 285 on the shaft 80 of the front sprocket 76 of the lower knife belt 70. Each stub shaft 279 may be journaled in any suitable bearing bracket 287 on the main frame 40.

In order to feed fish through the chute 240 toward and beyond the discharge end thereof, there is preferably provided a further feed roll 289 (Figs. 16 to 19) on a shaft 291 which is journaled in the forked end of a lever 293. The lever 293 has spaced arms 295, rotatably mounted with their ends on stubs 297 which project inwardly from suitable bearing blocks 299 on the opposite angles 248, respectively, of the frame work 244 (Figs. 17 and 17A). The lever 293 is, for the sake of clearing fish that pass through the chute 240, formed preferably as shown in Figs. 16 and 17, requiring two bends 301 and 303. Mounted on the shaft 291 of the feed roll 289 may be a sprocket 305 (Fig. 16) which, through a chain 307, is drivingly connected with a sprocket 309 on a stub shaft 311 that is rotatably mounted in the bend 301 in one of the arms 295 of the lever 293. Also mounted on the stub shaft 311 is another sprocket 313 which, through a chain 315, is drivingly connected with a sprocket 317 on a stub shaft 319, rotatably mounted in the other bend 303 in the same arm 295 of the lever 293 (Fig. 16). Mounted on the same stub shaft 319 is another sprocket 321 which, through chain 323, is drivingly connected with a sprocket 323*a* on a shaft 323*b*, journaled in the adjacent bearing block 299*a* (Fig. 17A). Mounted on the other end of the shaft 323*b* is a sprocket 323*c* which, through a chain and other suitable driving connections (not shown), may be driven from any suitable driven part of the apparatus. The feed roll 289 is thus driven in the direction of the arrow 325 in Fig. 16 so as to cooperate with the adjacent pair of driven feed rolls 270' in feeding fish through the chute 240 toward and beyond the discharge end thereof. The lever 293 is, in the absence of fish in the chute 240, stopped in the lowermost position shown in Fig. 16 by a stop 327 on one of the blocks 262, the lever 293 being preferably provided with a set screw 331 with which to engage the stop 327. The mere weight of the lever 293 and feed roll 289 thereon may be relied upon to force a fish in the chute 240 sufficiently into engagement with the adjacent pair of feed rolls 270' (Fig. 12) in order to cause the feed of the fish through and from the chute 240.

Prior to leaving the last pair of cooperating rolls 270, the back fins *f'* of fish fed through the chute 240 enter a fin guide 290 (Figs. 12 and 18), which is in the form of narrowly spaced metal leaves that extend between the knives 72 in the lower belt 70 to a point beyond which the gaps *g* between these knives are closed on the passage of the latter into the top run *x* of the lower belt 70. The leaves of the fin guide 290 may suitably be mounted on angle brackets 300, respectively, on a transverse angle 302 (Fig. 12) which may be mounted by angle brackets 304 on the opposite angles 248 of the framework 244. The leaves of the fin guide 290 are, at the entrance into the latter, outwardly flared as at 290' (Fig. 12) to facilitate the guidance of the fish tails and back fins into the guide 290. Thus, the several pairs of rolls 270, together with the guide flaps 286 on the chute sections 242 and the fin guide 290, form an uninterrupted guide for the tails $t$ and back fins $f'$ of fish throughout the chute 240 and therebeyond between the knives in the top run $x$ of the lower belt 70.

For further guidance of the fish onto the lower knife belt 70 for their correct impalement thereon, it is imperative that they be held against toppling over on the side from their correct disposition (Fig. 12). To this end, there are provided successive fish-centering gates 308, 310, 312, 314 and 316, each of which comprises a pair of opposite spring-closed sections between which the fish are adapted to pass. The sections of the gate 308 which may conveniently be pivoted at 320 on the opposite angles 254 (Figs. 6 and 26), are flared outwardly at their forward ends so that they may be swung open by a passing fish. Suitable linkage, described hereinafter, is provided between the sections of the gate 308 so that they will open and close in unison. The sections of the gate 308 are normally closed by a spring, described hereinafter, which causes the gate satisfactorily to center a fish therein without noticeably retarding the forward progress of the fish from the chute 240. The remaining gates 310 to 316 are in the present instance, carried by a table 322 which may be raised and lowered in a manner and for a purpose hereinafter described. However, the gates 310 to 316 may to all intents and purposes be carried by a fixed support (not shown) which may be like, and located in place of, the table 322 in its lower position (Figs. 15 to 17), and the table 322 in its lower position is, in the following description of the apparatus, considered a fixed support, until special reference is had to its function when raised and lowered. The forward ends of the opposite sections of the gates 310 to 316 are, like the sections of the gate 308, flared outwardly to permit the fish to enter the former (Fig. 2).

Figure 3:
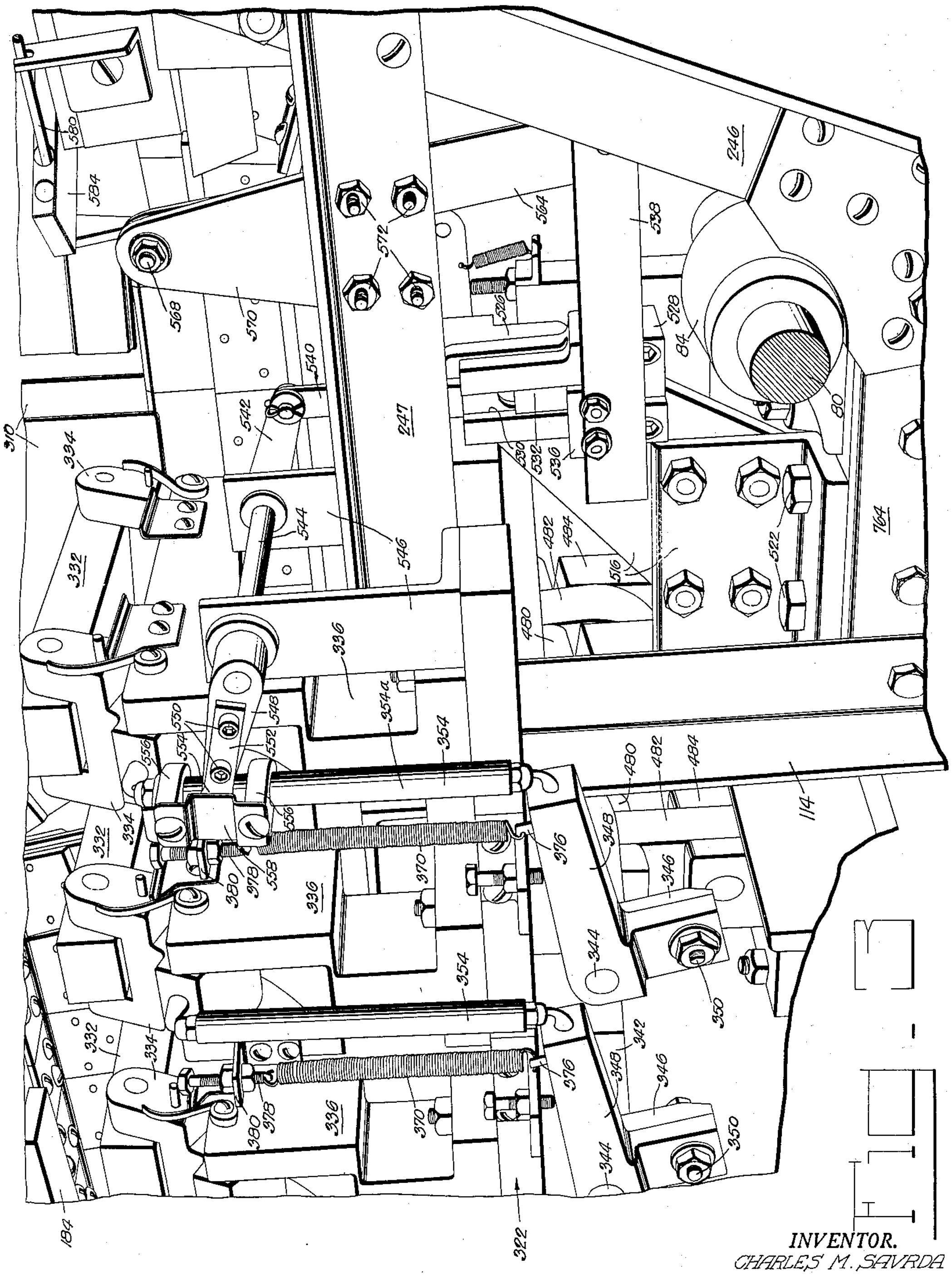

Since the mountings of the gates 310 to 316 on the table 322 are identical, only one of these mountings will be described in detail. Thus, the opposite sections of the gate 310 are, as shown in Fig. 8, suitably mounted at 330 on bars 332, respectively, each of which is, in turn, mounted by links 334 on a bracket 336 on the table 322. Suitably mounted on the bottom surface of the table 322 is a bracket 340, providing opposite journal bearings 342 for a shaft 344. Pinned or otherwise secured to one end of the shaft 344 is a rocker 346, and journaled on the same shaft end is a lever 348 which is angularly adjustably secured to the rocker 346 in any conventional manner, as by a bolt 350 which may extend through an aperture in the rocker 346 and through an arcuate slot in the lever 348. The lever 348 is operatively connected with the adjacent link 334 by means of a push rod 354 (see also Fig. 3), having universal ball and socket connections 354' with both, the link 334 and the lever 348. The other end of the shaft 344 has mounted thereon a rocker 356, and journaled on the same shaft end is a lever 358 (see also Fig. 4). The lever 358 is angularly adjustably secured to the rocker 356 in any conventional manner, as by means of a bolt 360 (Fig. 23) which extends through an aperture 364 in the rocker 356 and through an arcuate slot 366 in the lever 358. The lever 358 is operatively connected with the adjacent link 334 by a push rod 368, the latter having universal ball-and-socket connections 368' with the lever 358 and link 334, respectively. The angular adjustability of the levers 348 and 358 relative to the rockers 346 and 356, respectively, permits accurate centering of the opposite sections of the gate 310 with respect to the aligned knives in both belts 70 and 150, as will be readily understood. Also, the above-described operating linkage between the sections of the gate 310 compels the same to open and close in unison. As already mentioned, the gate 310 is, like the gates 312, 314 and 316, normally spring-closed. To this end, either lever 348 or 358, and preferably both, are urged by tension springs 370 into the positions shown in Figs. 3 and 4, respectively, in which the gate 310 is in the closed position shown in Fig. 8. The opposite sections of the gate 310 are, in the closed position of the latter, held slightly spaced from the adjacent knives 72 by opposite shoulders 372 on the outermost links 334 which then bear against the adjacent brackets 336, respectively. The springs 370 may be anchored with one end on pins 376 on the levers 348 and 358, respectively, and with the other end on stud screws 378 which are adjustably mounted on angle brackets 380 on the opposite brackets 336, respectively (Figs. 3 and 4). The springs 370 are so tensioned that the gate 310 will satisfactorily center a fish therebetween relative to the aligned knives 72 in the belts 70 and 150, without noticeably retarding the forward progress of the fish in the apparatus in a manner described hereinafter.

Reference is now had to Figs. 16 and 17, showing mechanism for guiding the tails $t$ and belly fins $f$ of fish into the gap $g$ between the opposite knives 72 in the upper belt 150. Thus, there are pivotally mounted on outwardly projecting stubs 380 on the bearing blocks 299 the arms 384a, respectively, of a bracket 384, having depending bosses 385 in which are journaled shafts 387, respectively, that diverge in the fashion shown in Fig. 17. The shafts 387 carry at their lower ends cooperating rollers 386, and at their upper ends collars 389 which, in conjunction with the corresponding rollers 386, prevent axial movement of the shafts 387 in their respective bosses 385. The bracket 384 is, in the absence of a fish in the chute beneath the rollers 386, permitted to gravitate into the lowermost position shown in Fig. 16 in which the rollers 386 clear the adjacent knives in the lower belt 70. One of the bracket arms 384a carries a set screw 388 which in the lowermost position of the bracket 384 bears against the stop 327. The rollers 386 have frusto-conical peripheries which, due to the divergence of the rotary axes of the rollers, have a bite closely approximating the cross-sectional shape of a fish fin. Thus, the tail $t$ and belly fins $f$ of a fish, fed through the chute 240 while being manually held in the upright position shown in Fig. 12, will unfailingly be guided by the converging peripheries of the rollers 386 into the bite of the latter where they are brushed erect into their stiffest condition by the adjacent peripheries of the rollers 386. The described brushing action of the rollers is due to the fact that they are not power-driven, but are driven only through frictional driving engagement with the tail and belly fins of the passing fish.

Pivotally mounted at 392 on a depending lug 393 on the bracket 384 is a fin guide 394 in the form of two opposed sheet metal leaves which may be riveted together at 396 and flare outwardly toward the lower knife belt 70 in the fashion shown in Fig. 20. It will be noted from Figs. 16 and 17 that the fin guide 394 is in such close proximity to the rollers 386 that the tail $t$ or any belly fin $f$ of a passing fish will, on leaving the bite of these rollers, unfailingly enter the fin guide 394 and be guided thereby into another fin guide 400 which, in turn, will continue the guidance of the tail and belly-fins of the fish into the gap $g$ between the opposite knives in the upper knife belt 150. The metal leaves of the fin guide 394 are at their bottom edges preferably curled outwardly as at 395 to form concave shoulders with which to rest on the belly-side of a fish passing therebeneath. The fin guide 394 has also an extension 397 which under certain conditions will be in engagement with a stop 399 on the bracket 384. The fin guide 400 comprises, in the present instance, opposite sheet-metal leaves which, with their guide portions 402, straddle the fin guide 394 fairly closely. The guide portions 402 of the fin guide 400 provide for the continued guidance of the tail t and belly-fins f of the fish into the gap g between the opposite knives in the upper belt 150. The guide portions 402 of the fin guide 400 are continuous with outwardly offset portions 404 thereof which clear the adjacent knives 72 in the upper belt 150, and are secured at 406 to a bracket 408 which may conveniently be pivotally mounted on the bearing brackets 160 in which the front sprocket 152 of the upper knife belt 150 is journaled. The guide portions 402 of the fin guide 400 may be held properly spaced from each other by a spacer 403 and a rivet 405 which extends through the latter (see also Fig. 21). Received in an angle bracket 410 on one of the angles 166 of the upper belt frame 164 is a set screw 412 which serves as a stop for the fin guide 400 in its lowermost position (Fig. 16), in which the same is safely spaced from the knives in the lower belt 70. Further, the fin guide 394 is prevented from swinging below the position shown in Fig. 16 by a laterally projecting pin 414 on the fin guide 400 against which rests a finger 416 that may be secured to the fin guide 394 by means of the rivets 396. The fin guides 394 and 400 are preferably provided on the inside of their opposed leaves with inwardly projecting leaf-type springs 415 and 417, respectively, which are opened by passing fish tails and belly fins, whereby the latter are brushed by these springs into erect disposition in which they attain their maximum stiffness. Correct guidance by the guides 394 and 400 of the tails and belly fins of fish from the rollers 386 into the gap g between the knives in the upper belt 150, is thus assured.

It will now be understood that the rollers 386 and the fin guides 394 and 400 assume the continuous guidance of the tail and belly-fins of a fish from the moment they enter the bite of the rollers 386 and until they pass into the gap g between the knives in the upper belt 150 (see particularly Fig. 17). Inasmuch as the tail and belly-fins of a fish enter the gap g in the upper knife belt 150 where the latter passes around the front sprocket 152, the tail or belly-fins of the fish may still escape laterally through the gaps g′ between consecutive knives in the upper belt 150. To prevent this, there is provided a further fin guide 422 which, in the present instance, comprises spaced arcuate metal leaves that extend into the gap g between the opposite knives in the upper belt 150 to a point beyond which the gaps g′ between these knives are closed as the latter pass into the lower run y′ of the upper belt 150. The leaves of the fin guide 422 may suitably be mounted at 424 on an angle 426 which, in turn, may be mounted on the angle bracket 410.

When feeding a fish in and from the chute 240 toward the lower knife belt 70 (Fig. 18), the tail t and belly-fins f of the fish successively enter the bite between the rolls 386 and will be fanned-out in consequence. As the fish reaches, during its forward feed in the chute 240, the approximate position shown in Fig. 18, the fin guide 394 begins to ride on the belly-side of the fish. Since the bracket 384 has at that time been raised somewhat, due to the contact of the rollers 386 with the belly-side of the fish, the fin guide 384 is tilted, in counterclockwise direction as viewed in Fig. 18, until the extension 397 of the fin guide 394 engages the stop 399 on the bracket 384. The stop 399 serves to prevent any further counterclockwise tilting of the fin guide 394 into an angular position in which the relatively sharp bottom edges 436, rather than the smoothly curved bottom portions 395, of the fin guide would ride on and rip the belly-side of the fish. At this time, the fin guide 400 is still in its lowermost position in which the guide-carrying bracket 408 rests on the stop screw 412. However, as the fish advances from the position shown in Fig. 18 to that shown in Fig. 19, the bracket 384 and fin guide 400 will be raised into the respective positions shown in Fig. 19, due to the seating engagement of the rollers 386 with progressively higher portions of the fish, and a corresponding rise of the bracket 408 through intermediation of the stop 399 on the bracket 384 and an extension 408a of the bracket 408. The fin guide 394 also rides on the fish, but only with its smoothly curved bottom portions 395, as will be readily understood. When the fish reaches the position shown in Fig. 19, the rollers 386 contact substantially the highest portion of the fish. During the continued forward feed of the fish from the position shown in Fig. 19, the belly-fins f of the fish are progressively guided into the gap g between the knives in the upper belt 150 until they may no longer escape from this gap.

Following is a description of the operation of the apparatus with the table 322 permanently in its lower position (Figs. 14 and 15). Fish are prepared for filleting in the present apparatus by removing their heads and entrails. The fish are then successively placed into the chute 240, tail first and back down as shown in dot-and-dash lines in Fig. 16. Since the filleting of all fish in the apparatus is the same, a description of the passage of one fish through the apparatus and its filleting therein will suffice for an understanding of the operation of the apparatus. Thus, the back fins f′, and the back, of the fish in the chute will be engaged by the feed rolls 270 and 289, respectively, with the result that the fish is fed toward the lower knife belt 70. The feed rolls 270 also guide the tail and back fins f′ of the fish into the fin guide 290 which continues the guidance of the tail and back fins of the fish into the gap g between the knives 72 in the lower belt 70. The guidance of the tail t and back fins f′ of the fish, in the manner just described, is assured since the fish enters the gate 308 which prevents the fish from toppling over on either side. Due to the inclination of the chute to the top run x of the lower knife belt 70, it stands to reason that the rapidly moving knives 72 in the latter incise the skin and cut into the flesh of progressive portions of the fish as they come in contact with these knives. Thus, the fish will be incised progressively from the tail end to the opposite end thereof. The gap g between the adjacent knives 72 in the lower belt 70 is such that these knives will, when entering the fish, straddle and be in very close proximity to the back spine s of the fish (Fig. 27). By virtue of the high traveling speed of the lower knife belt 70, the cutting edges e of the knives thereof incise the fish without requiring any appreciable downward pressure on the latter, as will be readily understood. In fact, the knife edges e incise the fish in a fashion simulating and having all the advantages of hand-filleting with a knife, and being in some respects superior to hand-filleting. Thus, the edges e of consecutive knives 72 act like a single knife blade which is drawn over and into the fish in one direction as in hand-filleting fish. The high travel speed of the knives 72 in the lower belt 70 secures further important advantages over filleting fish by hand, in that the knife edges e require practically no resistance from a fish in order satisfactorily to incise the same, and they are furthermore subject to a minimum of wear due to their high slicing speed. Thus, the fish, in a way, sinks into the knives in the lower belt 70 as it engages the same, the knives entering the fish approximately to the vertebrae v thereof (Figs. 15, 19 and 27). While the fish is being incised by the knives in the lower belt 70, the latter assumes the sole conveyance of the fish as hereinafter described more in detail, and carries it through and beyond the successive gates 310, 312, 314 and 316. When the knives in the lower belt 70 incise the fish, whatever meat m may stick to the back spine s (Fig. 27) is sufficiently wedged between opposite knives 72 to cause the fish to be carried along with the latter, but it is the wedging between these knives of the hard knuckles k of the fish which securely anchor the latter on the lower knife belt 70 for its assured conveyance thereon.

As the fish leaves the chute 240 and approaches and is incised by the knives in the lower belt 70, the tail t and the belly-fins f of the fish are also guided into the gap g between the opposite knives in the upper belt 150, by means of the described rollers 386 and the successive fin guides 394, 400 and 422 (Figs. 16 to 19). The task of the rollers 386 and guides 394, 400 and 422 to guide the tail and belly-fins of the fish correctly into the gap $g$ between the knives in the upper belt 150, is immeasurably facilitated by virtue of the impalement of the fish on the knives in the lower belt 70. Such impalement rigidifies the fish to a very considerable extent and practically eliminates all possibilities of escape of the tail and belly-fins from the guides 394, 400 and 422.

As soon as the fish is impaled on the lower knife belt 70 in the fashion shown in Fig. 19, the former is carried on the latter against the knives 72 in the upper belt 150 which, due to the differential speed of the knives in both belts, incise the fish from the belly-side in the same fashion in which the same was incised by the knives in the lower belt (Fig. 27). Due to the lesser number of fins on the belly-side of the fish and the earlier impalement of the longest portion of the latter on the lower knife belt 70, the fish will continue to be conveyed through the apparatus by the knives in the lower belt 70, as will be readily understood. The fish is thus conveyed through the apparatus at the speed of the lower knife belt 70.

There is also provided in the apparatus a pair of ribbers 450 on the opposite sides of the top and bottom runs $x$ and $y'$ of the lower and upper knife belts 70 and 150, respectively (Figs. 7 and 25). These ribbers 450 are provided for the purpose of severing the fillets F' from the vertebrae $v$ and the ribs $r$ of the fish. Prior to the performance of the ribbers 450, the fillets F' of a fish carried by the lower knife belt 70 have been severed from the skeleton of the fish by the knives 72 in both belts 70 and 150 to the extent shown in Fig. 27, leaving the fillets still connected with the vertebrae $v$, as well as with the ribs $r$ of the fish. Fig. 7 shows the top run $x$ of the lower knife belt 70 in non-raised position at the idler sprocket 130. In actual use of the apparatus, however, the idler sprocket 130 is jacked up to an extent similar to that shown in Fig. 1, in order that the knives in the top and bottom belts 150 and 70, respectively, reach their maximum approach before the ribbers perform their designated function on the fish. The upper knife belt 150 may also be hingedly mounted as heretofore described, in which case the knife belts 70 and 150 are spaced from each other approximately as shown in Figs. 16, 18 and 19.

Since the ribbers 450 are identical in construction and have identical mountings, only one of these ribbers and its mounting will now be described in detail with particular reference to Figs. 7 and 25. Thus, either one of these ribbers 450 is provided with a laterally extending shank 451 which is journaled in a bearing bracket 452, suitably mounted at 453 on the underside of the adjacent rail 104. The ribber is generally in the form of a knife blade having longitudinal sections 454 and 455 which are hingedly connected at 456. The ribber is provided with a cutting edge 457 which extends uninterruptedly throughout the longitudinal extent of the ribber sections 454 and 455. The shank 451 of the ribber is axially slidable in the bearing bracket 452, and is normally urged by a spring 458 in a direction in which to urge the ribber section 454 into engagement with the adjacent knives 72 in the lower belt 70. The spring 458 is anchored with one end on the bearing bracket 452, and with its other end on an arm 459 on the ribber shank 451. The ribber is normally urged into the uppermost position shown in Fig. 7 by a spring 460 which is anchored with one end on the main frame of the apparatus, and with its other end on a projecting pin 461 on the arm 459. The bearing bracket 452 is provided with spaced stop pins 462 and 463 which are engaged by the arm 459 when the ribber is in its uppermost position (Fig. 7) or in a certain lowermost position, respectively. Inasmuch as the ribber extends partially below the mounting angles 100 of the knives in the lower belt 70, particularly when depressed from the position shown in Fig. 7, the ribber is laterally offset as at 464 in order to clear the angles 100 in any of its permissible angular positions. The ribber section 455 is normally urged by a spring 465 into the innermost position shown in Fig. 25, in which the same is somewhat inclined to the adjacent knife belt 70. The spring 456 is anchored at one end to the adjacent guide rail 106, and with its other end to a laterally extending bracket arm 466 on the ribber section 455. The ribber section 455 is prevented from swinging inwardly beyond the innermost position shown in Fig. 25, by an adjustable stop 467 on the adjacent guide rail 106, said stop being engaged by the bracket arm 466 on the ribber section 455. The ribber section is prevented from swinging beyond an outermost position by an adjustable stop 468 on the adjacent guide rail 106, said stop 468 being adapted to be engaged by the bracket arm 466 on the ribber section 455. The portions of the cutting edge 457 on the ribber sections 454 and 455, respectively, extend linearly (Fig. 25).

The sections 454 of the ribbers 450 are adapted to sever the fillets F' from the vertebrae $v$ of a passing fish (Fig. 28), while the sections 455 of the ribbers are adapted to cut the fillets F' from the ribs $r$ of the same fish (Fig. 29). Inasmuch as the veretbrae $v$ of a fish being operated on by the ribbers 450 are situated in the gap between the upper and lower knife belts 70 and 150 (Figs. 11 and 27), the cutting edges of the leading sections 454 of the ribbers extend across this gap and thus continue the cutting action of the knives 72 in the lower belt 70, by incising the fish on both sides of the vertebrae $v$ thereof in the fahion shown in Fig. 28. While the fish is shown partly incised by the leading ribber sections 454, it is understood that the latter will, on further advance of the fish with the lower knife belt 70, completely sever the fillets F' from the skeleton of the fish to a point where the ribs $r$ of the latter branch laterally from the vertebrae $v$.

After the fillets F' are thus severed from the skeleton of the fish by the leading ribber sections 454, the trailing ribber sections 455 perform their designated function of cutting the fillets F' from the ribs $r$ of the fish. While the cutting edges of the ribber sections 454 are, for the sake of reducing meat loss to a minimum, arranged closely contiguous with the adjacent knives 72 in the lower belt 70 (Fig. 28), the remaining cutting edges of the ribbers 450 are provided on the opposite sides of the latter (Fig. 29) so that they may cut the fillets from the ribs $r$ of the fish with a minimum of pressure. Hence, the cutting edge 457 of each ribber 450 crosses from one side to the other side thereof approximately at the point 470 at which, during the normal forward conveyance of a fish on the lower knife belt 70, the severance of the fillets F' from the vertebrae $v$ of the fish is concluded, and the severance of the same fillets from the ribs $r$ of the fish begins.

It is a well known fact that the opposite ribs of progressive pairs along the vertebrae of a fish are inclined to each other at gradually varying angles. In order that the hinged sections 455 of the ribbers 450 may follow the differently diverging ribs $r$ of the fish, they are mounted, as described, in order to be capable of the requisite compound motion to follow the ribs $r$. Thus, the section 455 of each ribber 450 is movable in two transverse directions, by virtue of the depressability of the ribber against the action of the associated spring 460, and the swingability of the ribber section 455 against the action of the associated spring 465. Thus, the cutting edges of the ribber sections 455 are spring-urged in two transverse directions against the ribs $r$ of the forwardly moving fish, and are forced by these ribs to yield in the same directions, the sole contact between the ribs $r$ and the ribber sections 455 being along the cutting edges of the latter. More particularly, the ribbers 450 are depressed, and the ribber sections 455 are swung outwardly, by the ribs $r$ of any passing fish to an extent solely depending on the size and relative inclination of the ribs *r*. Thus, the depressability of the ribbers 450, in conjunction with the swingability of the ribber sections 455, constitute a most simple and highly effective expediency, not only for removing fillets from the ribs of fish with a minimum loss of meat, but also for accomplishing the same economic filleting of fish of varying sizes.

After the fillets F' are completely severed from the skeleton of the fish (Fig. 29), they will drop onto the lower knife belt 70 and be carried thereon to the end of the top run *x* of the latter where they may drop off into any suitable container (not shown). The skeleton of the fish will, after the complete removal of the fillets therefrom, be dropped from the lower knife belt 70 in its return or bottom run *y*. The skeleton of the fish is initially loosened between the knives in the lower belt 70 when it is drawn from the gap *g* between the opposite knives in the upper belt 150, and is thrown from the fast-traveling lower belt 70 as the same passes around the rear sprocket 78.

Figure 5:
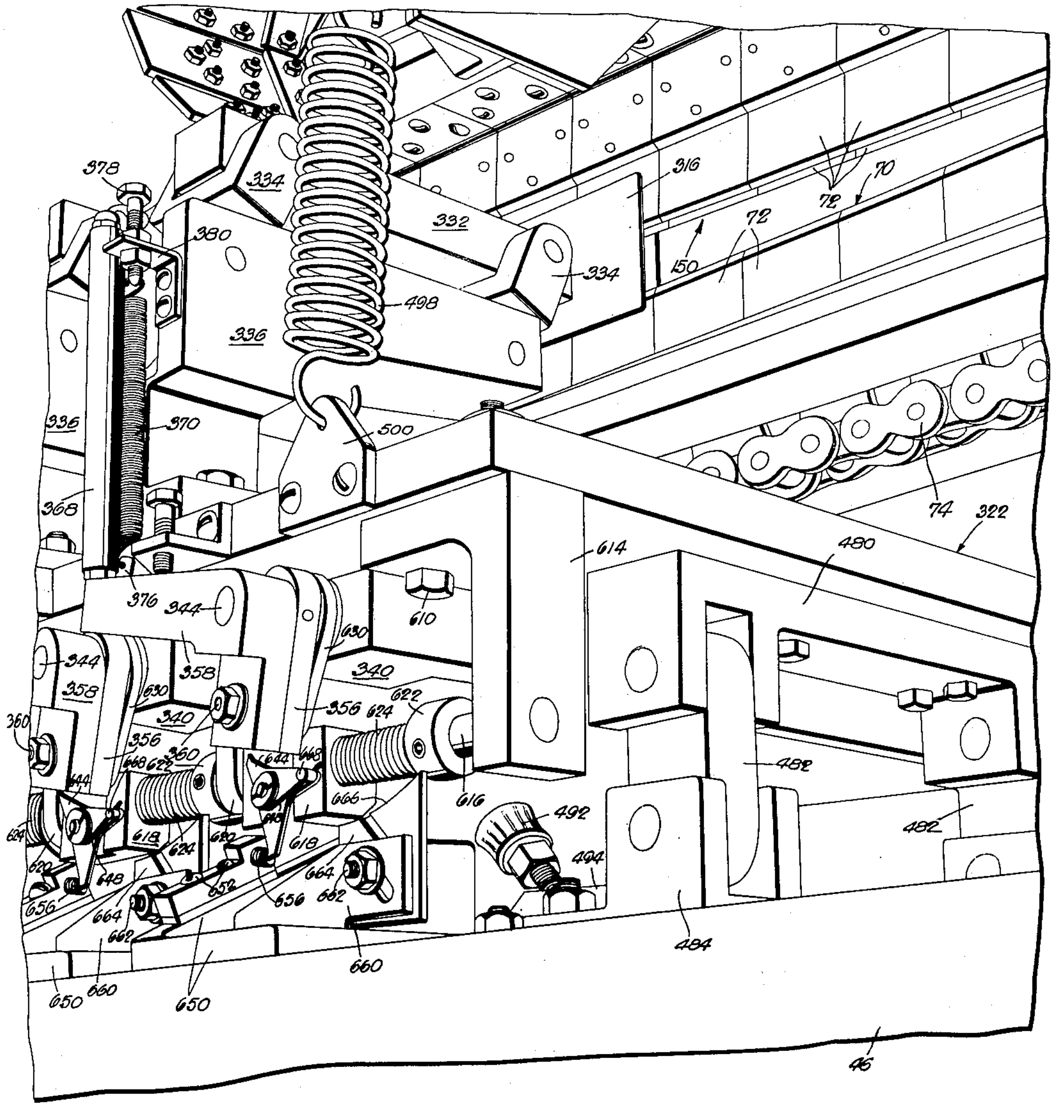

As previously mentioned, the instant apparatus may be used in a modified manner, by lowering and raising the table 322 for each passing fish for the purpose of impaling the same most firmly on the knives in the lower belt 70 for its assured conveyance thereon. To this end, the table 322 has mounted on its bottom surface spaced brackets 480 which are connected by link pairs 482, respectively, with brackets 484, respectively, on the intermediate rails 63 of the main frame 40 (Figs. 5, 6 and 9). The links 482 thus permit the table 322 to move in an arcuate path about the pivots 486 from the raised position shown in Figs. 1, 6, 8 and 9, into the lower position shown in Figs. 14 and 15 in which a block 490 on the bottom surface of the table 322 engages an adjustable, preferably padded stop 492 on a bracket 494 which extends across, and is suitably secured at 496 to the intermediate rails 63 of the main frame 40 (Fig. 6). The table 322 is normally urged into its raised position by springs 498 on opposite sides of the lower knife belt 70 (Figs. 1, 5 and 6). Each spring 498 is anchored with one end on a bracket 500 on the table 322, and with its other end on a turn-buckle 502 which, in turn, is removably held on a depending hook 504 on the angle 168 of the upper belt frame 164. As described, the table 322 carries the gates 310, 312, 314 and 316. The table 322 is, in its raised position, releasably arrested against descent into its lower position by a latch 510 which is normally urged by a spring 512 into latching engagement with a companion member 514 on the table 322. The latch member 510 is carried by a stub shaft 515 which is journaled in a bracket 516, mounted at 522 on one of the intermediate rails 63 of the main frame 40. The latch member 510 is, for the descent of the table 322, retracted from the companion member 514 at the moment when a fish has left the gate 308 and is positioned between the gate 310. To this end, the stub shaft 515, which carries the latch member 510 at one end thereof, carries at its other end a depending arm 526 to which is suitably secured a block 528 having a guideway 530 for a slide 532. The slide 532 is provided with a lug 534 which projects to the front of the member 528 for cooperation with a shoulder projection 536 on a shift bar 538. The slide 532 is connected by a link 540 with an arm 542 on a stub shaft 544 which is journaled in suitable angle brackets 546 on the table 322 (see also Fig. 3). Mounted on the other end of the stub shaft 544 is an arm 548 to which is secured at 550 the shank 552 of a roller-shaped follower 554 that is straddled by spaced collars 556 on the adjacent push rod 354*a*. Preferably, there is secured to the collars 556 a cover 558 which closes the gap between the collars 556 in which the follower 554 is located. The shift bar 538 is pivotally carried at 560 and 562 by arms 564 and 566, respectively, of which the arm 564 is pivoted at 568 on a plate 570, mounted at 572 on one of the angles 247 which re-enforce the framework 244 (see also Fig. 3). The arm 566 is mounted on one end of a shaft 576 which is journaled in the angles 254 and carries at its other end a shorter arm 578 (Fig. 2). The free ends of the arms 566 and 578 are pivotally connected at the same distance above the shaft 576 with links 580 and 582, respectively, which are also pivotally connected with arms 584 on the opposite sections, respectively, of the gate 308. A spring 588 (Figs. 1 and 6) normally urges the arms 584 into engagement with adjustable stops 590 on brackets 591 on the angles 254, respectively. The spring 588 accomplishes this through intermediation of the shift bar 538, the arms 566 and 578, and the links 580 and 582. The spring 588 is anchored with one end on a depending lug 602 on one of the angles 248, and with its other end on a lateral extension 600 of the shift bar 538. The opposite sections of the gate 308 are in the closed position shown in Figs. 1 and 26, when the arms 584 engage their respective stops 590.

As a fish passes from the chute 240 into the gate 308, the latter is opened, with the result that the shift bar 538 is shifted to the left, as viewed in Fig. 6, into a position in which the shoulder projection 536 thereon is to the left of the lug 534 on the slide 532 in the block 528, the lug 534 on the slide 532 being then below and out of the path of movement of the shoulder projection 536 on the shift bar 538 (Fig. 8). The shift bar 538 remains in this advanced position while the fish passes through the gate 308 and into the gate 310 and succeeding gates. As the fish enters the gate 310 and, in consequence, opens the latter, the lug 534 on the slide 532 is raised into the path of return movement of the shoulder projection 536 on the shift bar 538, through intermediation of the arm 548 with its follower 554 (Fig. 3), shaft 544, arm 542, and link 540. While the fish passes through the gate 310, the latter remains open, and the lug 534 on the slide 532 consequently remains in the path of return movement of the shoulder projection 536 on the shift bar 538. When the fish, on its forward motion toward the lower knife belt 70, clears the gate 308, the latter will close by the action of the spring 588, resulting also in return movement of the shift bar 538 to its normal retracted position (Fig. 6). The fish is then still in the gate 310, with the result that the lug 534 on the slide 532 is in the path of the shoulder projection 536 on the shift bar 538 when the latter is spring-returned to its retracted position. The shoulder projection 536 on the returning shift bar 538 will thus engage the lug 534 on the slide 532 and rock the block 528 and attached arm 526, as well as the latch member 510, counterclockwise as viewed in Fig. 6, thereby retracting the latch member 510 from the companion member 514 on the table 322 to permit the latter to swing into its lower position. It will now be understood that the table 322 is released from the latch member 510, and is free to drop to its lower position, immediately after the fish has left the gate 308 but is still within the gate 310.

In passing into the progressive gates 308, 310 and subsequent gates, the fish is incised by the knives in the lower belt 70, progressively from the tail end to the other end thereof, to a relatively small extent which is, however, sufficient to cause the fish to be dragged forward by and with these knives.

The drag thus exerted by the traveling knives in the lower belt 70 on the incised fish is utilized in forcing the released table 322 into its lower position. To this end and for another purpose to be described, provisions are made firmly to clamp the fish in the gates 310, 312 and succeeding gates on the table 322 into which it may extend, shortly after the table is released for descent into its lower position. When this clamping force is exerted on the fish by the gates on the table 322, the forward drag exerted by the knives in the lower belt 70 on the clamped fish will be imparted by the latter to the released table 322 in its upper position and start the same on its downward swing, against the tendency of the spring 498 to hold the table in its raised position. Inasmuch as very little resistance is required by the clamped fish in order to be cut by the fast-traveling knives in the lower belt 70, the forward momentum imparted by the clamped fish to the raised table 322 is sufficient to carry the latter all the way to its lowermost position at such speed that the fish is rammed into the lower knives and becomes firmly anchored thereon for its conveyance therewith (Fig. 14). The fish-clamping provisions are further designed to release the clamping pressure from the fish as soon as the table 322 reaches its lower position, thereby completely releasing the fish for its conveyance on the lower knife belt 70 as soon as the former is firmly anchored on the latter as explained, as well as releasing the table 322 for ascent to its raised position by the action of the springs 498.

The fish-clamping provisions above mentioned will now be described. Mounted at 610 on the bottom surface of the table 322 are depending brackets 612 and 614 (Figs. 4 and 5) in which is firmly mounted a shaft 616. Slidably arranged on the shaft 616 are blocks 618 which are associated with the adjacent levers 358, respectively. Adjustably mounted on the shaft 616 and associated with each block 618 is a stop collar 620, as well as a spring-retaining collar 622 (see also Fig. 22). Surrounding the shaft 616, and interposed between each block 618 and associated collar 622 is a compression spring 624 which normally urges the block 618 into engagement with the associated stop collar 620. Pivoted at 626 on each block 618 is a latch 628 (Figs. 22 and 23) which normally engages the adjacent stop collar 620 to hold the spring-urged block 618 spaced from the latter in the fashion shown in Fig. 22. Journaled on each rocker 356 for independent turning movement coaxially of the latter is an arm 630 having a roller-shaped end 632 slidably received in a guide groove 634 in the associated block 618 (Figs. 22 and 23). Mounted in a recess 636 in each rocker 356, as by the bolt 360 and a pin 638, for instance, is a ratchet segment 640 having teeth 642 with which is adapted to cooperate a pawl 644, pivoted at 646 on the roller-shaped end 632 of the adjacent arm 630. Each pawl 644 is normally urged into engagement with its associated ratchet segment 640 by a spring 648.

It will be understood from the preceding description that each lever 358 is operatively disconnected from the associated spring-urged block 618 when the associated pawl 644 is retracted from the adjacent ratchet segment 640. Hence, while the pawls 644 are retracted from their respective ratchet segments 640, the gates 310 to 316 on the table 322 are in no wise connected with the spring-urged blocks 618, and they are urged into closed position by the fish-centering force of the relatively weak springs 370. The referred to fish-clamping pressure is imparted to the gates 310 to 316 by the spring-urged blocks 618, respectively, on the shaft 616, wherefore the pawls 644 are retracted from their associated ratchet segments 640 when the table 322 is either in its raised position or in its lower position, in either of which the gates 310 to 316 are intended to be relieved of their fish-clamping pressure. In order to retract the pawls 644 from their associated ratchet segments 640 when the table 322 is in its raised position (Figs. 4 and 5), the following provisions are made. Suitably mounted on one of the side rails 46 of the main frame 40 are angle brackets 650 which are associated with the pawls 644, respectively. Mounted at 652 on each angle bracket 650 is a block 654 carrying an adjustable stop 656 which, in the raised position of the table 322, is engaged by, and holds, the associated pawl 644 out of engagement with the adjacent ratchet segment 640. Of course, each pawl 644 will, almost immediately at the start of the raised table 322 into its lower position, retract from the associated stop 656 and be spring-urged into engagement with the adjacent ratchet segment 640, as will be readily understood.

Suitably mounted on each angle bracket 650 is another bracket 660 to which is adjustable secured at 662 a plate 664, having a curved edge 666 that serves as a stop for a stud 668 on the associated pawl 644. Thus, shortly before the table 322 reaches its lower position, the studs 668 on the pawls 644 engage the edges 666 of the associated stop plates 664, with the result that the pawls 644 are retracted from their respective ratchet segments 640.

As will be described hereinafter more in detail, the springs 624 are, in the raised position of the table 322, held compressed by the associated blocks 618 which are then held spaced from the adjacent stop collars 620 by the latches 628 (Fig. 22). With the pawls 644 retracted from their respective ratchet segments 640 when the table 322 is in its raised position, the gates 310 to 316 on the latter may be opened by a fish to an extent commensurate with its size, and the levers 358 and associated ratchet segments 640 will be turned through corresponding angular distances, counterclockwise as viewed in Fig. 22, without any obstruction from the pawls 644. With the levers 358 and ratchet segments 640 assuming angular positions corresponding to the opening of the gates on the table 322, provisions to be described retract the latches 628 from locking relation with the associated stop collars 620 shortly after the pawls 644 operatively engage the associated ratchet segments 640 at the start of the downward swing of the table 322 into its lower position. As soon as the latches 628 are retracted from the stop collars 620, each block 618 will apply the full force of its associated spring 624 to the associated gate on the table 322, with the result that a fish between the gates 310 to 316 will be firmly compressed therebetween for its assured impalement on the knives in the lower belt 70 on the succeeding quick downward swing of the table 322.

The provisions for retracting the latches 628 from the adjacent stop collars 620 shortly after the start of the downward swing of the raised table 322 into its lower position, will now be described with special reference to Figs. 23 and 24. Thus, there is further mounted at 680 on each angle bracket 650 a bar 682, having at its top oppositely beveled cam surfaces 684 and 686, with which a laterally extending pin 688 on the adjacent latch 628 is adapted to cooperate. Fig. 24 shows the relative position and coordination of the parts 618, 620, 628 and 682 when the table 322 is in its raised position. Shortly after the pawls 644 operatively engage their respective ratchet segments 640 at the start of each downward swing of the raised table 322 into its lower position, the pins 688 on the latches 628 ride over the cam surfaces 684 on the adjacent bars 682, with the result that the latches 628 are raised from latching engagement with the adjacent stop collars 620 for a sufficient length of time to permit spring-expansion of the blocks 618.

The gates 310 to 316 are relieved of the pressure of the springs 624 substantially when the table 322 reaches its lower position, this being accomplished by the stop plates 664, the edges 666 of which then engage the studs 668 on the associated pawls 644 and retract the latter from the associated ratchet segments 640, respectively. When the pawls 644 are thus retracted from their respective ratchet segments 640, the springs 624 will expand fully and force the associated blocks 618 into engagement with the adjacent stop collars 620, as will be readily understood. Since the impaled fish on the lower knife belt 70 is quickly carried by the latter away from the gates 310 to 316 when the table 322 reaches its lower position, the table may spring-return to its raised position in ample time to receive the next fish between the gates 310 to 316. Likewise, the gates 310 to 316 will be closed by the weak springs 370, in time to receive the next fish. The closing movement of the gates 310 to 316 is not in any way obstructed by the pawls 644 which, shortly after the start of the ascent of the table 322 from its lower position, engage their respective ratchet segment 640 until they are again disengaged therefrom by the stop pins 656 in the raised position of the table.

In order to recompress the springs 624 for the clamping of the next fish to reach the gates 310 to 318 on the raised table 322, there is provided on each block 618 a laterally extending lug 694 which may conveniently be formed by an angle (Figs. 23 and 24). Adapted to cooperate with the lug 694 on each block 618 is an adjustable stud 696 on the adjacent bar 682. Each stud 696 serves as a stop for the lug 694 on the associated block 618 on the return movement of the table 322 into its raised position. In the course of the ascent of the table 322, each latch 628 is, through cooperation of its pin 688 with the cam surface 686 of the associated bar 682, cammed over the latter, as will be readily understood. Shortly after the latches 628 have been cammed over the adjacent bars 682, the fixed studs 696 engage the lugs 694 on the associated blocks 618 and prevent the latter from further movement axially of the shaft 616 while the table 322 continues to ascend to its raised position. Thus, while the studs 696 hold back the associated blocks 618 and latches 628 when the table 322 continues its ascent into raised position (Fig. 24A), the stop collars 620 disengage from the associated blocks 618 and advance therefrom until the adjacent latches 628 drop into latching relation therewith (Fig. 24).

It is now obvious form the foregoing description that the gates 310 to 316 on the table 322 are, in the raised position of the latter, held closed by the action of the relatively weak springs 370 so that these gates will not appreciably impede the feed of a fish thereinto, but will nevertheless hold the fish accurately centered with respect to the knives in the lower belt 70. It will now be further understood that the gates on the table 322 will, shortly after the release of the latter for its downward swing into lower position, firmly clamp the fish from opposite sides. The fish, which is thus firmly clamped between the gates on the table 322, is rammed into and becomes quickly impaled on the adjacent knives in the lower belt 70 on the quick downward swing of the table into its lower position, with the result that the fish will most firmly be anchored on these knives and will without fail be conveyed thereon through the apparatus as soon as the clamping pressure on the gates 310 to 316 is relieved shortly before the table 322 reaches its lower position. The gates 310 to 316 remain relieved of the clamping pressure during the following upward swing of the table 322 into its raised position and until the latter is again swung from its raised position to its lower position. Each fish will, on being carried by the lower knife belt 70 from the gates 310 to 316 on the lowered table 322, be incised by the knives in the upper belt 150, and finish-filleted by the ribbers 450, in substantially the same manner described previously in the case where the table 322 was considered to be permanently in its lower position.

The tail and fin-guiding means 386, 394 and 400, as well as the feed roll 289, shown in Figs. 16 and 17, may be arranged so as to be sufficiently movable to be applicable to fish in the case where the table 322 is dropped for the sudden impalement of the successive fish on the knives in the lower belt 70. Of course, any other suitable tail and fin-guiding means may be provided in lieu of those shown in Figs. 16 and 17.

While the knives 72 in the belts 70 and 150 are dimensioned to accommodate fish of maximum size, by being of a height to keep from the plate slides 94 the back or belly fins of fish passing through the apparatus, it is also contemplated to use the modified type of knife belt 700 shown in Fig. 30, which dispenses with the plate slides 94 used in the knife belts 70 and 150 so as to leave the gap between the knives 72′ open at the feet 72″ of the latter. Thus, while in either of the previously described knife belts 70 or 150 the fins of an excessively large fish may become so crowded between opposite knives 72 as to become wedged therein to an extent where satisfactory filleting performance of the apparatus may be jeopardized, this condition cannot possibly arise in the instant modified knife belt 700, because the fins of even an extremely large fish may freely extend into and beyond the gap between adjacent knives 72′ thereof. The knife belt 700 may be either the upper belt or the lower belt in the apparatus, and the other belt may also be like the instant knife belt 700. The knives 72′ in the belt 700 are mounted at 702 on angles 704, respectively, which are, in turn, mounted at 706 on special links 708 of chains 710, respectively. The special links 708 in each chain, which alternate with conventional links, have extensions 712 of which those of opposite links 708 straddle not only the sprocket 714 over which the chain passes, but also support rails (not shown) on which the top run of the chain is slidably supported in much the same manner in which the top runs of the previously described belts 70 and 150 are supported on their respective rails 104 and 184. Fig. 30 shows one of the two double sprockets 714 over which the chains 710 of the knife belt 700 pass. The sprocket 714 is mounted at 718 on a shaft 720 which is suitably journaled at 722 in bearing brackets 724 and 726, respectively, on any suitable frame 728 which may suitably be mounted on the main frame 40 of the apparatus. The shaft 720 of the sprocket 714 may be coupled at 730 to a drive shaft 732 which may in any suitable manner (not shown) be drivingly connected with the belt drive C of the apparatus. Fig. 30 further shows support rails 743 and guide bars 736 which, together, form a linear track 738 for the bottom run of the belt 700.

Reference is now had to Figs. 31 to 33, inclusive, which show a modified tripping mechanism for the latch member 510 which releasably holds the table 322 in its raised position. The instant latch-tripping mechanism includes the previously described pivoted block 528, the slide 532 therein with its projecting lug 534, the link 540 and remaining part of the linkage which connects the slide 532 with the push rod 354*a* (Fig. 3), and the shift bar 538 without its shoulder projection 536, however. The shift bar 538 has, in the present instance, a floating pivotal connection 750 with an arm 752 which is journaled at 754 on the hub 756 of a cam disk 758. The cam disk 758 is journaled on a stub shaft 760 that projects from one side of a bracket 762 on an angle 764 which is mounted on one of the intermediate rails 63 of the main frame 40. The cam disk 758 is preferably angularly adjustably secured to the arm 752 as at 766. Cooperating with the cam disk 758 is a laterally projecting pin 768 on a pawl 770 which is carried by a stub shaft 772. The stub shaft 772 is journaled in a boss 774 of an arm 776 which is in turn journaled on the stub shaft 760 (Fig. 33). Secured at 778 to the arm 776 is a rocker 780 which is adapted to cooperate with the projecting lug 534 on the slide 532 in the block 528 in rocking the latter about the axis of the shaft 515 for the retraction of the latch member 510 from the companion member 514 on the table 322. Also carried by the stub shaft 772 is a finger 782 which is adapted to cooperate with an inclined shoulder 784 on the projecting lug 534 on the slide 532 in holding the pin 768 on the pawl 770 out of operative engagement with the cam disk 758. Journaled on another stub shaft 786 on the bracket 762 is a lever 788 which carries a follower 790 that cooperates with a cam disk 792 on a shaft 794 journaled in a suitable bearing bracket 796 on the adjacent side rail 63 of the main frame 40. The shaft 794 with the cam disk 792 may be driven in one direction in any suitable manner (not shown) in timed relation with the belt drive C.

As heretofore pointed out, opening of the gate 308 by a fish entering thereinto will result in movement of the shift bar 538 from the position shown in Fig. 31 to that shown in Fig. 34. During this movement of the shift bar 538, the fish has not yet opened the first gate 310 on the table 322, wherefore the slide 532 is still in the lowermost position shown in Fig. 31 in which the shoulder 784 on the projecting lug 534 is engaged by the finger 782, with the result that the pawl 770 is held out of operative engagement with the cam disk 758. As the fish enters on its continued forward feed the gate 310, the slide 532 in the block 528 is, as heretofore, raised from the position shown in Fig. 31 to that shown in Fig. 34, releasing thereby the pawl 770 for cooperation of its pin 768 with the cam disk 758. Inasmuch as the cam disk 792 is, during the operation of the apparatus, continuously driven, the lever 788 is continuously oscillated. At the time the pawl 770 is released for cooperation with the cam disk 758, the pin 768 of the former rests on a raised lobe 800 of the latter which, due to the then advanced position of the shift bar 538 (Fig. 34), is then in cooperative relation with the pin 768 on the pawl 770. While the pin 768 rests on the raised lobe 800 of the cam disk 758, the pawl 770 is held out of cooperative relation with a shoulder 802 on the oscillating lever 788 (Fig. 34). However, when the fish leaves the gate 308, the shift bar 538 is permitted to spring-return to its retracted position (Figs. 31 and 35), shifting thereby the cam disk 758 from the position shown in Fig. 34 to that shown in Fig. 35 in which the pin 768 on the pawl 770 is in cooperative relation with a depressed portion 806 of the cam disk 758 which admits the pawl 770 into the path of the shoulder 802 on the oscillating lever 788. Thus, when the fish leaves the gate 308 and while it is still in the gate 310, the pawl 770 is admitted into the path of the shoulder 802, so that the pawl 770 and rocker 780 will, on the next clockwise movement of the cam-oscillated lever 788, be rocked into the position shown in Fig. 35, in the course of which the rocker 780 rocks the block 528 to cause retraction of the latch member 510 from the companion member 514 on the table 322 and thereby release the latter for descent into its lower position.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. In fish-filleting apparatus, the combination of two cooperating cutting devices positioned one above the other comprising movable endless conveyors, respectively, having adjacent vertically spaced striaght runs, series of knife blades carried by and projecting from each conveyor towards the other conveyor, the blades of said series being arranged end-to-end in two adjacent rows, respectively, extending longitudinally and spaced laterally of said conveyor, and means for driving a conveyor, the blade rows in said adjacent conveyor runs being spaced from and in substantial longitudinal alignment with each other so as to sever the flesh from the spine on the opposite sides, respectively, of the vertebrae of a fish guided with its spine between the blade rows on said adjacent conveyor runs, and means mounting one of said conveyors on said apparatus for movement to and from the other conveyor to permit variation of the spacing between the aligned blade rows on said adjacent conveyor runs.

2. The combination in fish-filleting apparatus as set forth in claim 1, in which said one conveyor is pivotally mounted on said apparatus near an end of said straight run thereof to permit variation of the spacing between the aligned blade runs on said adjacent conveyor runs.

3. In fish-filleting apparatus, a movable endless conveyor having a series of knife blades secured thereto and projecting therefrom, said series of blades being secured to said conveyor in end-to-end relation in two closely adjacent companion rows, the latter extending longitudinally and spaced laterally of said conveyor, said knife blades being in fixed relation relative to said conveyor and to each other and being adapted to support and convey a fish partially impaled thereon between said companion rows, and means operatively connected to said conveyor for driving the latter in a lineal direction whereby to convey a fish partially impaled between said companion rows of said knife blades in said direction.

4. In fish filleting apparatus, the combination of two cooperating cutting devices, each comprising a movable endless conveyor having a series of knife blades projecting therefrom, said series of blades being secured to said conveyor in end-to-end relation in two closely adjacent rows, respectively, the latter extending longitudinally and spaced laterally of said conveyor, the blade rows of said devices being vertically spaced with the blade rows of one of said devices being laterally spaced from each other in closely adjacent relation for the reception therebetween of part of a fish to be conveyed, the cooperating blade rows of the other device being in substantial vertical alignment and cooperatively associated with those of said first device as to perform a cutting operation on the fish as the latter is being conveyed on said blade rows of said one device.

5. In fish filleting apparatus, the combination of two cooperating cutting devices, each comprising a movable endless conveyor having a series of knife blades projecting therefrom, said series of blades being secured to said conveyor in end-to-end relation in two closely adjacent rows, respectively, the latter extending longitudinally and spaced laterally of said conveyor, the blade rows of said devices being vertically spaced with the blade rows of one of said devices being laterally spaced from each other in closely adjacent relation for the impalement thereon of a fish to be conveyed, the cooperating blade rows of the other device being in substantial vertical alignment and so operatively associated with those of said first device as to sever the flesh of the fish as the latter is being conveyed on said blade rows of said one device, said conveyors having substantially straight opposed operating runs of which that of one conveyor is offset rearwardly from the forward end of the other conveyor's operating run but extends at least in part within the longitudinal extent of the latter.

6. In fish-filleting apparatus, the combination of a pair of cooperating cutting devices, each of said devices comprising a movable endless conveyor having a series of knife blades projecting therefrom, said series of knife blades being connected to said conveyor in end-to-end relation in two closely adjacent companion rows, the latter extending longitudinally and spaced laterally of said conveyor, both of said conveyors having a substantially horizontal operating run movable in one lineal direction, said companion rows of the operating runs of said devices being in substantial vertical alignment and cooperatively associated whereby one of said devices is adapted to sever the flesh from the spine of a fish as the latter is being conveyed on said blade rows of the other of said devices, and means operatively connected to said conveyors for moving the latter in said direction whereby to concomitantly move said knife blades in said direction.

7. In fish-filleting apparatus, the combination of a pair of cooperating cutting devices, each of said devices comprising a movable endless conveyor having a series of knife blades projecting therefrom, said series of knife blades being connected to said conveyor in end-to-end relation in two closely adjacent companion rows, the latter extending longitudinally and spaced laterally of said conveyor, both of said conveyors having a substantially horizontal operating run movable in one lineal direction, said companion rows of the operating runs of said devices being in substantial vertical alignment and cooperatively associated whereby one of said devices is adapted to sever the flesh from the spine of a fish as the latter is being conveyed on said blade rows of the other of said devices, the operating run of one device being offset rearwardly from the forward end of the operating run of the other device but extends at least in part within the longitudinal extent of the latter, and means operatively connected to said conveyors for moving the latter in said direction whereby to concomitantly move said knife blades in said direction.

8. In fish-filleting apparatus, the combination of a pair of cooperating cutting devices, each of said devices comprising a movable endless conveyor having a series of knife blades projecting therefrom, said series of knife blades being connected to said conveyor in end-to-end relation in two closely adjacent companion rows, the latter extending longitudinally and spaced laterally of said conveyor, both of said conveyors having a substantially horizontal operating run movable in one lineal direction, said companion rows of the operating runs of said devices being in substantial vertical alignment and cooperatively associated whereby one of said devices is adapted to sever the flesh from the spine of a fish as the latter is being conveyed on said blade rows of the other of said devices, one of said conveyors being mounted for movement to and from the other conveyor to provide for variation of the spacing between the aligned blade rows of the operating runs of said conveyors, means for mounting said one conveyor on said apparatus for said movement thereof, and means operatively connected to said conveyors for moving the latter in said direction whereby to concomitantly move said knife blades in said direction.

9. In fish-filleting apparatus, the combination of a pair of cooperating cutting devices, each of said devices comprising a movable endless conveyor having a series of knife blades projecting therefrom, said series of knife blades being connected to said conveyor in end-to-end relation in two closely adjacent companion rows, the latter extending longitudinally and spaced laterally of said conveyor, both of said conveyors having a substantially horizontal operating run movable in one lineal direction, said companion rows of the operating runs of said devices being in substantial vertical alignment and cooperatively associated whereby one of said devices is adapted to sever the flesh from the spine of a fish as the latter is being conveyed on said blade rows of the other of said devices, means providing substantial slack in the operating run of one of said conveyors whereby to permit said run to yield and accommodate itself to successive fish fed between said operating runs, and means operatively connected to said conveyors for moving the latter in said direction whereby to concomitantly move said knife blades in said direction.

10. In fish-filleting apparatus, the combination of a pair of cooperating cutting devices, each of said devices comprising a movable endless conveyor having a series of knife blades projecting therefrom, said series of knife blades being connected to said conveyor in end-to-end relation in two closely adjacent companion rows, the latter extending longitudinally and spaced laterally of said conveyor, both of said conveyors having a substantially horizontal operating run movable in one lineal direction, said companion rows of the operating runs of said devices being in substantial vertical alignment and cooperatively associated whereby one of said devices is adapted to sever the flesh from the spine of a fish as the latter is being conveyed on said blade rows of the other of said devices, means providing substantial slack in the operating run of one of said conveyors whereby to permit said run to yield and accommodate itself to successive fish fed between said operating runs, the latter being driven at different speeds, and means operatively connected to said conveyors for moving the latter at different speeds in said direction.

References Cited in the file of this patent

UNITED STATES PATENTS

| | | |
|---|---|---|
| 631,153 | Clark | Aug. 15, 1899 |
| 851,122 | Duensing | Apr. 23, 1907 |
| 1,226,910 | Reed et al. | May 22, 1917 |
| 1,671,295 | Kirby | May 29, 1928 |
| 1,743,044 | Morgan | Jan. 7, 1930 |
| 1,777,069 | Bottker et al. | Sept. 30, 1930 |
| 1,795,137 | Nye | Mar. 3, 1931 |
| 1,885,829 | Hunt | Nov. 1, 1932 |
| 2,006,376 | Vogt | July 2, 1935 |
| 2,210,234 | Durand | Aug. 6, 1940 |
| 2,217,075 | O'Malley | Oct. 8, 1940 |
| 2,255,812 | Rickman | Sept 16, 1941 |
| 2,325,680 | Hunt | Aug. 3, 1943 |
| 2,380,753 | Segerstad | July 31, 1945 |
| 2,403,518 | Gaddini | July 9, 1946 |
| 2,484,426 | Savrda | Oct. 11, 1949 |
| 2,502,176 | Savrda | Mar. 28, 1950 |
| 2,532,198 | Savrda | Nov. 28, 1950 |
| 2,550,025 | Savrda | Apr. 24, 1951 |